(12) United States Patent
Wencel et al.

(10) Patent No.: US 8,108,428 B1
(45) Date of Patent: Jan. 31, 2012

(54) VENDOR/CLIENT INFORMATION SYSTEM ARCHITECTURE

(75) Inventors: Ronald Wencel, Frankfort, IL (US); Richard Boone, Kirkland, WA (US); Thomas G. Melling, Sammamish, WA (US)

(73) Assignee: Legal Systems Holding Company, Bellevue, WA (US)

( * ) Notice: Subject to any disclaimer, the term of this patent is extended or adjusted under 35 U.S.C. 154(b) by 827 days.

(21) Appl. No.: 11/001,630

(22) Filed: Nov. 30, 2004

(51) Int. Cl.
*G06F 7/00* (2006.01)
*G06F 17/30* (2006.01)

(52) U.S. Cl. ........ 707/790; 707/791; 707/792; 715/700; 705/300; 705/301

(58) Field of Classification Search .................. None
See application file for complete search history.

(56) References Cited

U.S. PATENT DOCUMENTS

| | | | |
|---|---|---|---|
| 5,216,592 A | 6/1993 | Mann et al. | |
| 5,765,140 A * | 6/1998 | Knudson et al. | 705/9 |
| 5,893,905 A * | 4/1999 | Main et al. | 705/11 |
| 5,907,490 A * | 5/1999 | Oliver | 700/90 |
| 5,991,742 A | 11/1999 | Tran | 705/32 |
| 6,247,047 B1 * | 6/2001 | Wolff | 709/219 |
| 6,523,027 B1 * | 2/2003 | Underwood | 1/1 |
| 6,601,233 B1 * | 7/2003 | Underwood | 717/102 |
| 6,609,128 B1 * | 8/2003 | Underwood | 707/610 |
| 6,629,081 B1 * | 9/2003 | Cornelius et al. | 705/30 |
| 6,633,878 B1 * | 10/2003 | Underwood | 1/1 |
| 6,804,785 B2 | 10/2004 | Steele et al. | |
| 6,882,986 B1 | 4/2005 | Heinemann et al. | |
| 7,013,290 B2 * | 3/2006 | Ananian | 705/27 |
| 7,305,392 B1 * | 12/2007 | Abrams et al. | 707/9 |
| 7,406,427 B1 * | 7/2008 | Guyan et al. | 705/4 |
| 7,437,327 B2 * | 10/2008 | Lam et al. | 705/40 |
| 7,693,759 B2 | 4/2010 | Alberti et al. | |
| 7,707,055 B2 | 4/2010 | Behmoiras et al. | |
| 2001/0032170 A1 * | 10/2001 | Sheth | 705/37 |
| 2001/0042032 A1 * | 11/2001 | Crawshaw et al. | 705/32 |
| 2002/0023030 A1 | 2/2002 | Prohaska et al. | |
| 2002/0040352 A1 | 4/2002 | McCormick | |
| 2002/0111897 A1 | 8/2002 | Davis | |
| 2002/0112186 A1 * | 8/2002 | Ford et al. | 713/201 |
| 2002/0156697 A1 * | 10/2002 | Okuhara et al. | 705/26 |
| 2002/0173934 A1 | 11/2002 | Potenza | |
| 2002/0178093 A1 * | 11/2002 | Dean et al. | 705/28 |
| 2002/0194081 A1 * | 12/2002 | Perkowski | 705/26 |
| 2002/0198791 A1 * | 12/2002 | Perkowski | 705/26 |
| 2003/0018543 A1 * | 1/2003 | Alger et al. | 705/27 |

(Continued)

OTHER PUBLICATIONS

DataCert Announces Availability of Cost Management and Workflow Tool; Web-Based Software Boosts ROI and Automates Invoice Management, Business Editors & High-Tech/Legal Writers, Business Wire, New York: Jun. 21, 2002, p. 1, 3 pages.
Notice of Allowance for U.S. Appl. No. 10/864,290, Mail Date Jun. 29, 2009, 23 pages.
Non-Final Office Action for U.S. Appl. No. 10/923,606, Mail Date Aug. 3, 2009, 31 pages.

(Continued)

*Primary Examiner* — Mohammad Ali
*Assistant Examiner* — Angelica Ruiz
(74) *Attorney, Agent, or Firm* — Perkins Coie LLP

(57) ABSTRACT

A data network storing data relating to work done by vendors for clients is described. The network includes two or more servers, each server containing (1) an exhaustive vendor data base that contains client-independent vendor data for every vendor, and (2) one or more individual client databases, each containing client information for a single client. The exhaustive vendor data base is replicated between the servers, and the client information for each client is contained by one individual client data base on one server.

15 Claims, 37 Drawing Sheets

U.S. PATENT DOCUMENTS

| | | | |
|---|---|---|---|
| 2003/0028451 | A1* | 2/2003 | Ananian .......................... 705/27 |
| 2003/0033226 | A1* | 2/2003 | Anderson ....................... 705/32 |
| 2003/0046169 | A1 | 3/2003 | Fraser et al. |
| 2003/0144969 | A1* | 7/2003 | Coyne ........................... 705/400 |
| 2003/0212609 | A1* | 11/2003 | Blair et al. ..................... 705/26 |
| 2003/0220855 | A1* | 11/2003 | Lam et al. ....................... 705/34 |
| 2004/0019528 | A1* | 1/2004 | Broussard et al. .............. 705/26 |
| 2004/0034578 | A1 | 2/2004 | Oney et al. |
| 2004/0093302 | A1* | 5/2004 | Baker et al. .................... 705/37 |
| 2004/0230523 | A1* | 11/2004 | Johnson ......................... 705/40 |
| 2004/0243483 | A1* | 12/2004 | Baumann et al. ............... 705/27 |
| 2005/0027586 | A1* | 2/2005 | Bacon et al. ..................... 705/10 |
| 2005/0033598 | A1 | 2/2005 | Knapp et al. |
| 2005/0049966 | A1 | 3/2005 | Melling et al. |
| 2005/0132048 | A1* | 6/2005 | Kogan et al. .................. 709/225 |
| 2005/0203800 | A1* | 9/2005 | Sweeney et al. ................ 705/14 |
| 2005/0203814 | A1 | 9/2005 | Derry et al. |
| 2005/0278232 | A1* | 12/2005 | Bruffey et al. .................. 705/30 |
| 2007/0061260 | A1 | 3/2007 | deGroeve et al. |

OTHER PUBLICATIONS

U.S. Appl. No. 10/864,290, filed Jun. 9, 2004, Melling et al.
U.S. Appl. No. 11/415,361, filed May 1, 2006, Boone et al.
U.S. Appl. No. 11/847,258, filed Aug. 29, 2007, Melling et al.
U.S. Appl. No. 12/566,468, filed Sep. 24, 2009, Melling et al.
Non-Final Office Action for U.S. Appl. No. 11/415,361, Mail Date Mar. 3, 2010, 52 pages.
Final Office Action for U.S. Appl. No. 10/923,606, Mail Date Apr. 1, 2010, 36 pages.
Final Office Action for U.S. Appl. No. 11/415,361, Mail Date Oct. 21, 2010, 36 pages.
Non-Final Office Action for U.S. Appl. No. 11/847,258, Mail Date Oct. 18, 2010, 22 pages.
Final Office Action for U.S. Appl. No. 11/847,258, Mail Date Apr. 14, 2011, 23 pages.
Non-Final Office Action for U.S. Appl. No. 12/566,468, Mail Date Mar. 4, 2011, 28 pages.

* cited by examiner

*FIG. 8*

Important Marketing Opportunity
Firm profile information will be available to all corporate clients on Serengeti, which they will use to find and engage new attorneys.

＊ indicates a required field

- Firm Name: ＊ — Henderson Crenshaw and Firth — 1701
- Short Firm Name: ＊ — Henderson Crenshaw — 1702
  *A Law Firm's short name should include at least two names separated with a space (e.g. The Smith, Doe, & Blackingham Firm => Smith Doe). However, a solo practitioner's last and first names should be separated with a comma (John Davis Attorney at Law => Davis, John).*
- Type of Service Provider: ＊ — Law Firm — 1703
- Firm Profile/History: Henderson Crenshaw and Firth was founded in 1945 to provide premiere service in franchise law and related areas of law. HC&F remains dedicated to that ideal. — 1704
- Website: www.hencren.com — 1705
- Main Office: Seattle — 1706
- Previous Organization Name(s): — 1707
- Lead System Administrator ＊ — Hammer, Edward — [Select] — 1708
  *Click the "Select" button to designate the user who will be identified as the Lead Firm Administrator for all of your firm's clients on Serengeti Tracker. Click the question mark help link for more information about the Lead Firm Administrator's responsibilities in the Tracker system.*

FIRM PROFILE: William & Blake

| | | |
|---|---|---|
| Lead System Admin: | Ball, John | |
| Backup System Admin: | Harper, Charles | |
| Firm Classification | Standard | |
| Status: | Live | |
| Default Vendor Nos: | 104823 483984 298349 | |
| Matters: | 10 open – 18 closed | |
| Evaluation Percentile: | 47 | |
| Budgeting Percentile: | 66 | |
| Responsiveness Percentile: | 35 | |
| Total Percentile: | 37 | |

Tabs: Firm Profile | Office Profiles | Stats | Evaluations | Matters

Firm Profile for William & Blake

Matters & Spending

Total Number of Unique Open Matters 2004 (through May): 6
Total Number of Unique Open Matters 2003: 10
Total Number of Unique Open Matters 2002: 8

Total Fees & Expenses FY 2004 (through May): $238,837
Total Fees & Expenses FY 2003: $1,384,838
Total Fees & Expenses FY 2002: $1,834,983

Budget to Actual Spending

| Category | 2002 | 2003 | 2004 | Totals | Ave all Lawyers | Percentile |
|---|---|---|---|---|---|---|
| Percentage over budget (fiscal year or any phase): | 0% 0/10 | 33% 3/10 | N/A | 17% 3/20 | 26% | 65% |
| Cumulative spending-to-budget percentage (fiscal year or phase): | 89% | 101% | N/A | 95% | 120% | 85% |
| Average percentage deviation from budget (fiscal year or phase, absolute value): | 12% | 15% | N/A | 13% | 20% | 72% |

*FIG. 26A*

| Category | 2002 | 2003 | 2004 | Totals | Ave all Lawyers | Percentile |
|---|---|---|---|---|---|---|
| Percentage over budget (fiscal year or any phase): | 0% 0/10 | 33% 3/10 | N/A | 17% 3/20 | 26% | 65% |
| Cumulative spending-to-budget percentage (fiscal year or phase): | 89% | 101% | N/A | 95% | 120% | 85% |
| Average percentage deviation from budget (fiscal year or phase; absolute value): | 12% | 15% | N/A | 13% | 20% | 72% |

Responsiveness

| Category | 2002 | 2003 | 2004 | Totals | Ave all Lawyers | Percentile |
|---|---|---|---|---|---|---|
| Percentage of Matter Profiles lawyer did not complete within 20 days: | 0% | 10% | 0% | 3% | 21% | 84% |
| Average number of days to complete matter profile | 12 | 14 | 8 | 11 | 16 | 74% |
| Percentage of status reports more than 20 days late (i.e. after the 21st): | 5% | 24% | 8% | 12% | 18% | 56% |
| Average number of days to complete status report | 18 | 21 | 12 | 15 | 17 | 55% |
| Percentage of budgets filed more than 20 days after required: | 33% | 24% | 30% | 30% | 28% | 49% |
| Average number of days to complete budget | 18 | 21 | 12 | 15 | 17 | 55% |
| Percentage of bills submitted more than 20 days after billing period | 8% | 12% | 18% | 15% | 24% | 77% |
| Average number of days to submit invoice after billing period | 12 | 15 | 17 | 13 | 21 | 75% |

*FIG. 26B*

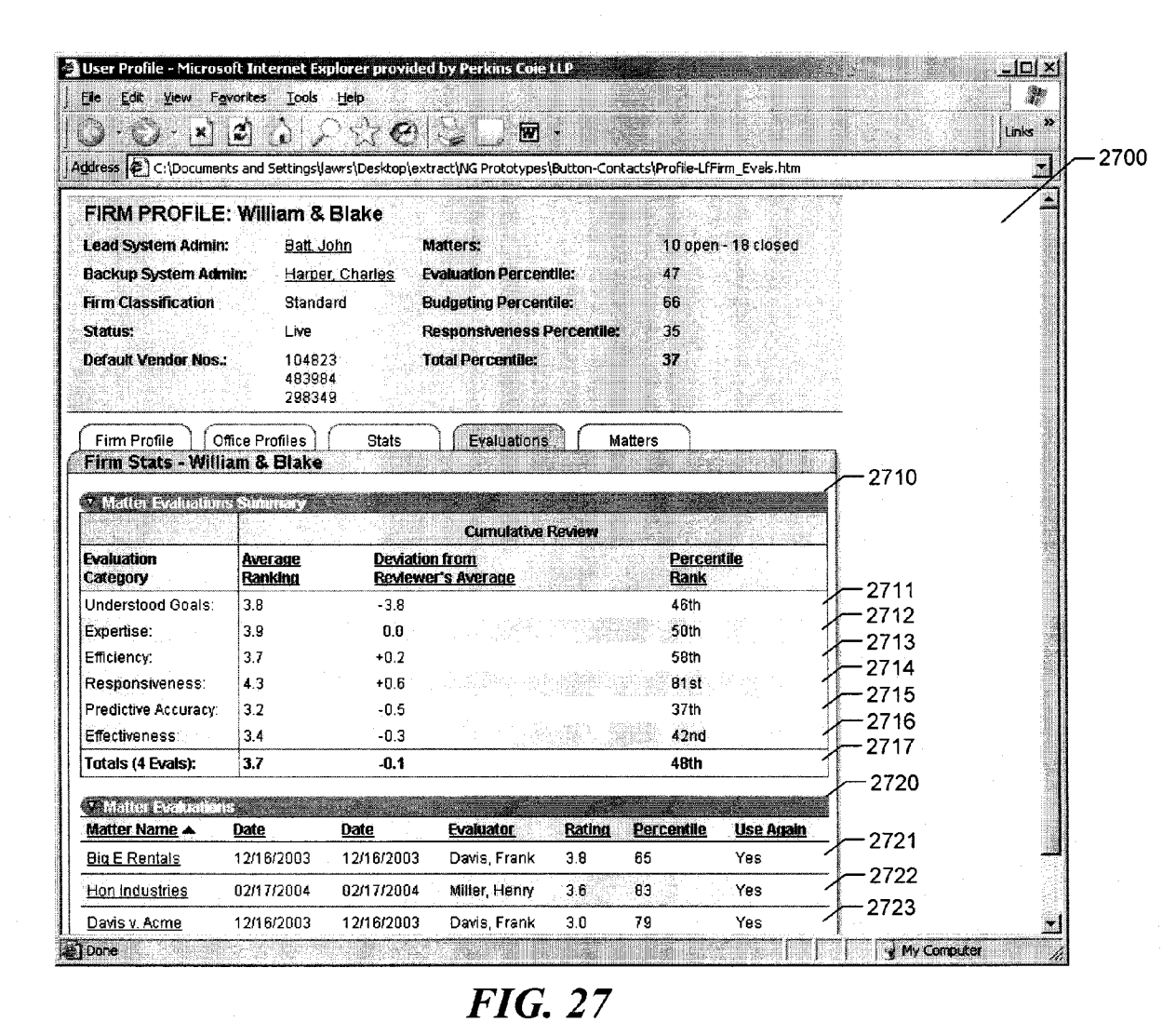

FIRM PROFILE: William & Blake

| | | | |
|---|---|---|---|
| Lead System Admin: | Batt, John | Matters: | 10 open - 19 closed |
| Backup System Admin: | Harper, Charles | Evaluation Percentile: | 47 |
| Firm Classification: | Standard | Budgeting Percentile: | 66 |
| Status: | Live | Responsiveness Percentile: | 35 |
| Default Vendor Nos.: | 104823<br>483984<br>298349 | Total Percentile: | 37 |

Firm Profile | Office Profiles | Stats | Evaluations | Matters

Firm Stats - William & Blake

Matter Evaluation Summary

| Evaluation Category | Average Ranking | Deviation from Reviewer's Average | | Cumulative Review | Percentile Rank |
|---|---|---|---|---|---|
| Understood Goals: | 3.8 | -3.8 | | | 46th |
| Expertise: | 3.9 | 0.0 | | | 50th |
| Efficiency: | 3.7 | +0.2 | | | 58th |
| Responsiveness: | 4.3 | +0.6 | | | 81st |
| Predictive Accuracy: | 3.2 | -0.5 | | | 37th |
| Effectiveness: | 3.4 | -0.3 | | | 42nd |
| Totals (4 Evals): | 3.7 | -0.1 | | | 48th |

Matter Evaluations

| Matter Name ▲ | Date | Evaluator | Rating | Percentile | Use Again |
|---|---|---|---|---|---|
| Big E Rentals | 12/16/2003 | Davis, Frank | 3.8 | 65 | Yes |
| Hon Industries | 02/17/2004 | Miller, Henry | 3.6 | 83 | Yes |
| Davis v. Acme | 12/16/2003 | Davis, Frank | 3.0 | 79 | Yes |

*FIG. 27*

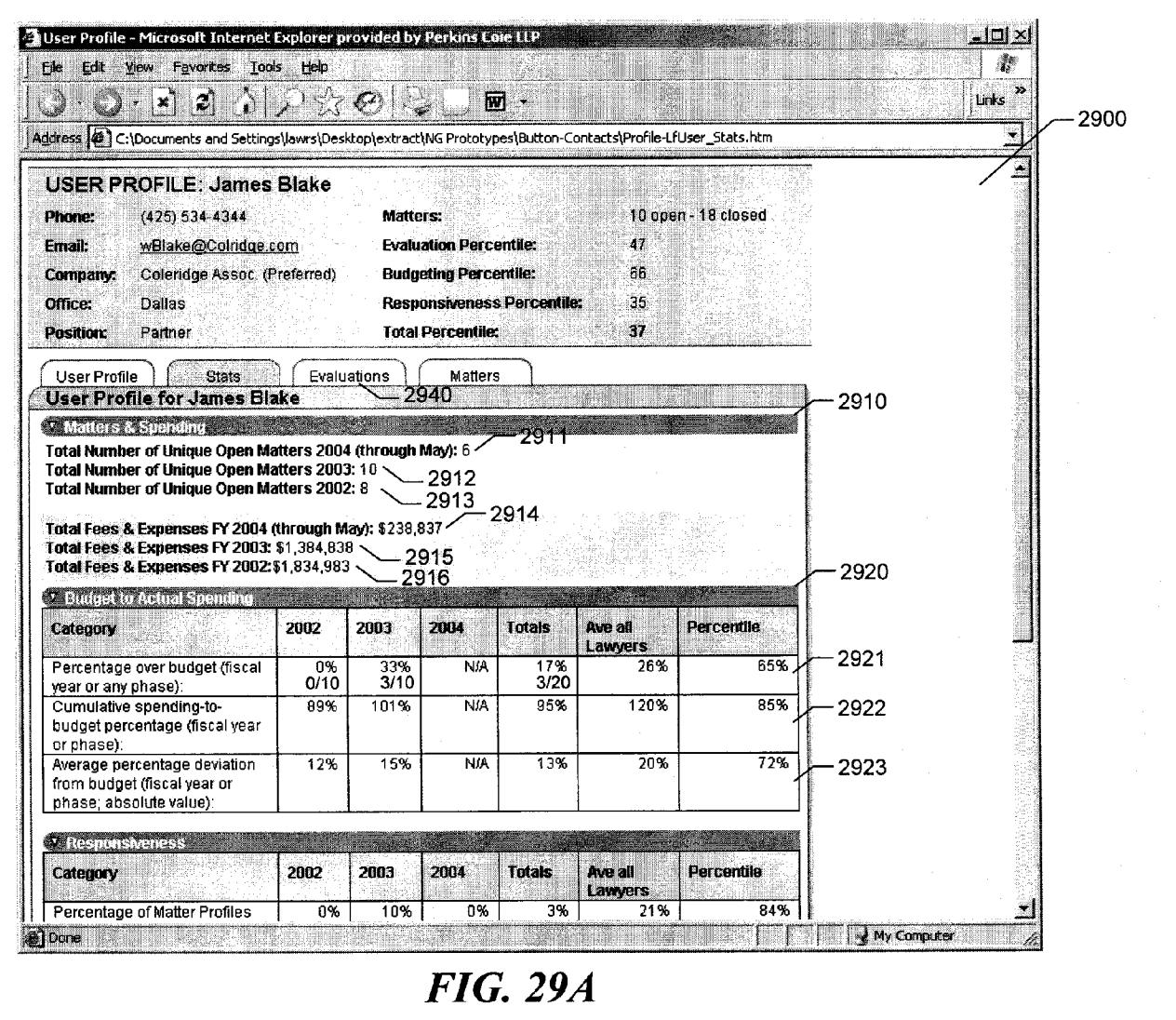

USER PROFILE: James Blake

| | | | |
|---|---|---|---|
| Phone: | (425) 534-4344 | Matters: | 10 open - 18 closed |
| Email: | wBlake@Colridge.com | Evaluation Percentile: | 47 |
| Company: | Coleridge Assoc. (Preferred) | Budgeting Percentile: | 56 |
| Office: | Dallas | Responsiveness Percentile: | 35 |
| Position: | Partner | Total Percentile: | 37 |

User Profile | Stats | Evaluations | Matters

User Profile for James Blake

Matters & Spending

Total Number of Unique Open Matters 2004 (through May): 6
Total Number of Unique Open Matters 2003: 10
Total Number of Unique Open Matters 2002: 8

Total Fees & Expenses FY 2004 (through May): $238,837
Total Fees & Expenses FY 2003: $1,384,838
Total Fees & Expenses FY 2002: $1,834,983

Budget vs. Actual Spending

| Category | 2002 | 2003 | 2004 | Totals | Ave all Lawyers | Percentile |
|---|---|---|---|---|---|---|
| Percentage over budget (fiscal year or any phase): | 0%<br>0/10 | 33%<br>3/10 | N/A | 17%<br>3/20 | 26% | 65% |
| Cumulative spending-to-budget percentage (fiscal year or phase): | 89% | 101% | N/A | 95% | 120% | 85% |
| Average percentage deviation from budget (fiscal year or phase, absolute value): | 12% | 15% | N/A | 13% | 20% | 72% |

Responsiveness

| Category | 2002 | 2003 | 2004 | Totals | Ave all Lawyers | Percentile |
|---|---|---|---|---|---|---|
| Percentage of Matter Profiles | 0% | 10% | 0% | 3% | 21% | 84% |

*FIG. 29A*

| Category | 2002 | 2003 | 2004 | Totals | Ave all Lawyers | Percentile |
|---|---|---|---|---|---|---|
| Percentage over budget (fiscal year or any phase): | 0% 0/10 | 33% 3/10 | N/A | 17% 3/20 | 26% | 65% |
| Cumulative spending-to-budget percentage (fiscal year or phase): | 89% | 101% | N/A | 95% | 120% | 85% |
| Average percentage deviation from budget (fiscal year or phase, absolute value): | 12% | 15% | N/A | 13% | 20% | 72% |

| Category | 2002 | 2003 | 2004 | Totals | Ave all Lawyers | Percentile |
|---|---|---|---|---|---|---|
| Percentage of Matter Profiles lawyer did not complete within 20 days: | 0% | 10% | 0% | 3% | 21% | 84% — 2931 |
| Average number of days to complete matter profile | 12 | 14 | 8 | 11 | 16 | 74% — 2932 |
| Percentage of status reports more than 20 days late (i.e. after the 21st): | 5% | 24% | 8% | 12% | 18% | 56% — 2933 |
| Average number of days to complete status report | 18 | 21 | 12 | 15 | 17 | 55% — 2934 |
| Percentage of budgets filed more than 20 days after required: | 33% | 24% | 30% | 30% | 28% | 48% — 2935 |
| Average number of days to complete budget | 18 | 21 | 12 | 15 | 17 | 55% — 2936 |
| Percentage of bills submitted more than 20 days after billing period | 8% | 12% | 18% | 15% | 24% | 77% — 2937 |
| Average number of days to submit invoice after billing period | 12 | 15 | 17 | 13 | 21 | 75% — 2938 |

(2930 indicator for first Percentile column of Responsiveness table)

*FIG. 29B*

VENDOR/CLIENT INFORMATION SYSTEM ARCHITECTURE

RELATED APPLICATIONS

This application is related to one or more of the following applications, each of which is hereby incorporated by reference in its entirety: U.S. Provisional Patent Application No. 60/497,246 filed on Aug. 22, 2003; U.S. Provisional Patent Application No. 60/477,425 filed on Jun. 9, 2003; U.S. patent application Ser. No. 10/864,290 filed on Jun. 9, 2004; U.S. patent application Ser. No. 10/923,606 filed on Aug. 20, 2004; and U.S. Provisional Patent Application No. 60/497,247 filed on Aug. 22, 2003.

TECHNICAL FIELD

The described technology is directed to the field of the provision of services by vertical market application service providers.

BACKGROUND

It may be desirable for a client of a vendor, such as a law firm, to track work done for the client by the vendor. In particular, it may be useful for a number of clients to use a common service to track work done by a number of different vendors, in a model where each client pays to use the service to track work done for the client by one or more vendors.

Such a service may be implemented using a client-centric data model, in which the service provides a separate database or instance of the service for each client's work. For a particular client, the client's database contains information about the client's projects, and each of the vendors engaged to work on these projects. For example, a client's database may contain information such as the following for two or more different vendors: the vendor's name, contact information for the vendor, and user information for the vendor. Much or possibly all of the information in a client's database might have to be manually entered by the client.

This client-centric data model has several possible disadvantages. As one example, where a particular vendor is engaged to work for three different clients, the vendor information must be separately entered (by either the vendor or the applicable client) in each database or instance of the service. Such data entry is redundant, and can create inconsistencies between the vendor information stored for the same vendor in different client databases, such as where (i) the information in one of the client's databases or instances of the service might have been entered incorrectly; (ii) one of the client's information about the vendor may have been inaccurate or out-of-date information, and such inaccurate information was therefore entered into the client's database or instance of the service; or (iii) information may have been initially entered correctly, but later becomes out-of-date (e.g. an attorney at a law firm leaves the law firm, and the law firm remembers to delete or deactivate the attorney in client #1's database but not in other client's databases). Moreover, where the vendor data stored for the same vendor in different client databases or instances of the service is inconsistent, the merging of this vendor with another vendor may require significant manual effort to reflect the merger in each client database containing vendor information for either of the two vendors.

Also, where a single vendor user is designated to maintain data for two or more different clients, the user may be required to maintain a different set of user credentials for each of these multiple clients, and log on to the service separately to maintain data for each of the multiple clients. Such requirements may impose significant burdens on vendor users.

Alternatively, to avoid the disadvantages of a client-centric data model, a service could be implemented using a client-commingled data model, in which the service combines the information about multiple clients' projects and their vendors' information in one database. Using the client-commingled data model, a single instance of a particular vendor's information could be maintained for all clients that are using the service, so that the particular vendor's information would not have to be redundantly entered for multiple clients, and the particular vendor's information would be consistent for all clients who are using the service.

This client-commingled data model, however, also has several possible disadvantages. As one example, if clients' projects contain potential confidential data, the client-commingled data model creates potential security weaknesses. The ability to ensure that only client #1 users see information about client #1 projects (or in other words that other clients' users cannot see information about client #1 projects) is dependant on the code comprising the client-commingled data model not having any errors or bugs that could allow other clients' users (or unauthorized vendor users) to see information about client #1's projects, or accidentally cause clients' information to be commingled. Since all code has varying amounts bugs and errors, this model does not offer the security of other models, such as a model that maintains information about each client's project in a separate database and does not allow cross-database queries and routines. Scalability can be another potential disadvantage of the client-commingled data model. For example, as the number of clients, client projects, and vendors increases in a single database, the processing speed of the service may be degraded.

In view of the disadvantages of the client-centric data model and the client-commingled data model discussed above, an improved data model that overcame some or all of these disadvantages would have significant utility.

BRIEF SUMMARY OF THE INVENTION

Not Applicable.

BRIEF DESCRIPTION OF THE DRAWINGS

FIG. 8 is a display diagram showing a sample display presented by the facility containing information relating to the addition of the firm to the list of firms associated with the company.

FIG. 17 is a display diagram showing a sample display presented by the facility containing a form for entering firm information for inclusion in the vendor directory.

FIGS. 18A-18C together comprise a display diagram showing a sample display presented by the facility containing a form for entering firm office information.

FIGS. 24A-24B is a display diagram showing a sample display presented by the facility containing a form for creating a new matter.

FIG. 24B is a display diagram showing a sample display presented by the facility containing a dialog box that can be used to select contents for the lead outside counsel field.

FIG. 24C is a display diagram showing a sample display presented by the facility containing an indication that the new matter has been created.

FIGS. 26A-26B are display diagrams together showing the sample display presented by the facility containing a detailed firm performance statistics report.

FIG. 27 is a display diagram showing a sample display presented by the facility containing a report of evaluations received by the same firm.

FIGS. 29A-29B are display diagrams together showing a sample display presented by the facility containing a detailed attorney performance statistics report.

DETAILED DESCRIPTION

Figure 1:
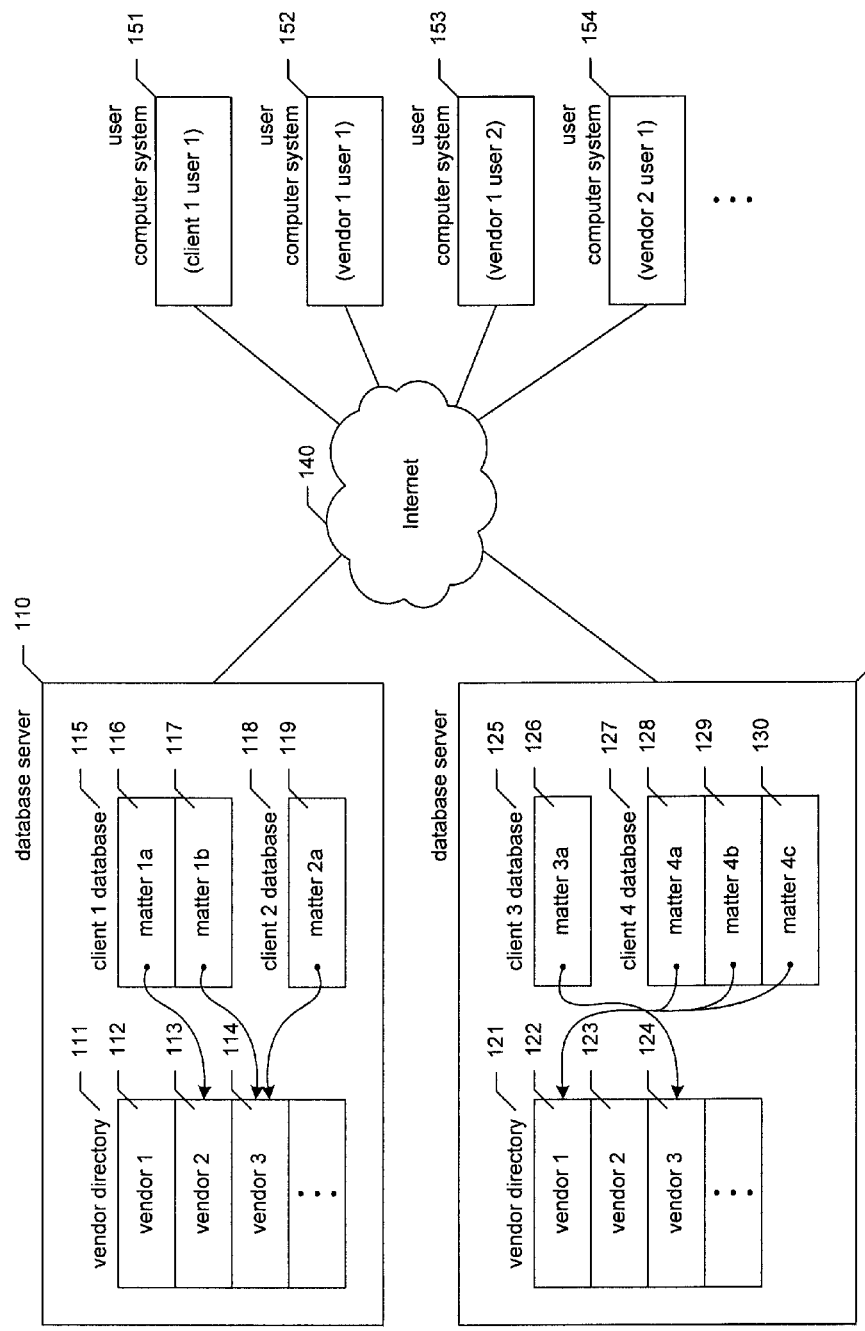
FIG. 1 is a network diagram showing a typical environment in which the facility operates.

A software and/or hardware facility for storing and presenting data relating to work done for clients by vendors ("the facility") is described. In some embodiments, the facility is incorporated as part of an ASP service used predominantly by vendors of a certain type—such as law firms—to submit bills to their clients, establish budgets and schedules, maintain status information, provide estimates and predictions of likely results, etc. In some embodiments, the facility stores certain information about vendors in a vendor directory that is separate from information about clients. For example, a vendor directory may contain, for each vendor, information about the vendor's name, locations, personnel, and users of the service. This vendor directory information is stored separately from client information, such as information identifying and describing clients and their matters, and the matters': cost estimates, schedules, predicted outcomes, billing and payment history, associated client and vendor users, etc.

This approach has many advantages. First, it enables a second client that hires a vendor that is already associated with a first client via the service to leverage vendor information already stored by the service in connection with the vendor's billing of the first client, (1) without incurring the labor cost of re-entering the information, and (2) without introducing inconsistencies between different versions of vendor information entered by different clients.

Second, it enables the fastest possible rollout of the service by additional clients. To begin working with the vendor the second client merely needs to select the existing vendor from the vendor directory.

Third, information in the vendor directory that changes can be updated in one place, which is then automatically reflected in all of the clients' databases that work with the particular vendor. This ensures the consistency and accuracy of vendor information throughout all clients' databases. Moreover, as the number of clients that a vendor works with on the facility increases, it increases the likelihood that a vendor will notice and fix any incorrect vendor information. In other words, growth and increasing use of the facility causes the accuracy of the vendor information to improve, while on the other hand, growth and increasing use of a client-centric data model leads to greater and greater entropy with respect to vendor information.

Fourth, responsibility for updating a vendor's vendor information is attributed to the vendor itself, who is the party most likely to have the most accurate and up-to-date version of this vendor information.

Fifth, even if a vendor uses the service for multiple clients, each vendor user has only one login (i.e. the vendor user goes to the same login page and uses the same user ID and password to login to the facility for all clients). This is particularly important advantage, because if vendor user had to remember multiple different user IDs and passwords for the service, vendor users would be more likely to forget their login credentials, or worse, they would jeopardize the security of the system by using the same login credentials for multiple clients or write down login credentials.

Sixth, the facility is able to automate the process of reflecting in the service (i) the merging of two vendors (or the acquisition of one vendor by another vendor, or any other combining of vendors); (ii) the consolidation of multiple offices of a particular vendor; and (iii) the transfer of a user from one vendor to another vendor.

Seventh, clients can search the vendor directory to find vendors who have certain areas of expertise, located in certain geographical regions, or who have the technical ability to provide certain services (e.g. generation and submission of LEDES-formatted invoices).

Eighth, the vendor directory can include vendor performance information about a vendor collected as part of the vendor's use of the service and its work for one or more clients (e.g. aggregate data such as rank compared to other vendors with respect to its ability to meet budget estimates, achieve predicted outcomes, file status reports timely, etc.), which may assist additional clients to select vendors for additional matters or other projects.

Finally, in some embodiments, the facility may prohibit cross-client database queries or updates. This ensures that any errors or bugs in the facility would not accidentally enable other clients' users (or unauthorized vendor users) to see information about a particular client's projects, or accidentally cause one client's information to be commingled with another client's information.

In some embodiments, the facility utilizes a group of two or more servers, each containing two or more databases. In these embodiments, the facility distributes client databases, each corresponding to a different client using the service, across the group of servers so that each client database resides on one of the servers of the group. Each server of the group further contains a replicated copy of a vendor database containing client-independent vendor information for all of the vendors associated with any of the clients. By using this approach, the facility is able to isolate client information in a single location for security purposes; reduce the number of clients that are affected when a server in the group fails; maintain the currency of vendor data when used in conjunction with any client; geographically distribute the servers, such as to be geographically proximate to the clients that they serve; scale to a large number of clients and/or matters; and/or dedicate a server to a single client, if desired by the client.

Accordingly, the facility tends to enhance the value of the service to the clients and vendors that use it, ensure only the authorized users can access data in the applicable client databases, as well as to facilitate the support of the service by its operator.

FIG. 1 is a network diagram showing a typical environment in which the facility operates. The environment includes a number of database server (or "server") computer systems, such as database server computer systems 110 and 120. Each database server contains a complete vendor directory—such as vendor directory 111 stored on database server 110—containing client-independent vendor information for all vendors registered with the service. For example, for each vendor, the vendor directory may include information identifying the vendor, vendor locations, and vendor users. Table 1 below shows sample fields of a vendor directory entry relating to the vendor; Table 2 shows sample vendor directory entry fields relating to vendor locations; Table 3 shows sample vendor directory entry fields relating to a vendor users who is an attorney (other users may have fewer fields or different fields).

TABLE 1

Vendor Profile

| Field | Who Can View the Field | Who Can Edit the Field |
| --- | --- | --- |
| Vendor Name: | All vendor and client users | Vendor Administrator only |
| Short Vendor Name: | All vendor and client users | Vendor Administrator only |
| Type of Service Provider: | All vendor and client users | Vendor Administrator only |
| Vendor Profile/History: | All vendor and client users | Vendor Administrator only |
| Website: | All vendor and client users | Vendor Administrator only |
| Lead System Administrator: | All vendor and client users | Vendor Administrator only |
| Backup Vendor Administrator: | All vendor and client users | Vendor Administrator only |
| Main Office: | All vendor and client users | Vendor Administrator only |
| List of Other Offices: | All vendor and client users | Vendor Administrator only |
| Previous Organization Name(s): | All vendor and client users | Vendor Administrator only |

TABLE 2

Office Profile

| Field | Who Can View the Field | Who Can Edit the Field |
| --- | --- | --- |
| Active: | All vendor and client users | Vendor Administrator only |
| Office Name: | All vendor and client users | Vendor Administrator only |
| Street 1: | All vendor and client users | Vendor Administrator only |
| Street 2: | All vendor and client users | Vendor Administrator only |
| City: | All vendor and client users | Vendor Administrator only |
| State: | All vendor and client users | Vendor Administrator only |
| Zip/Postal Code: | All vendor and client users | Vendor Administrator only |
| Country: | All vendor and client users | Vendor Administrator only |
| General Phone #: | All vendor and client users | Vendor Administrator only |
| General Fax #: | All vendor and client users | Vendor Administrator only |
| Tax ID: | All vendor and client users | Vendor Administrator only |

TABLE 2-continued

Office Profile

| Field | Who Can View the Field | Who Can Edit the Field |
|---|---|---|
| VAT ID (if applicable): | All vendor and client users | Vendor Administrator only |
| Office Base Currency: | All vendor and client users | Vendor Administrator only |
| Tracker Coordinator: | All vendor and client users | Vendor Administrator only |
| Backup Tracker Coordinator: | All vendor and client users | Vendor Administrator only |
| Managing Partner: | All vendor and client users | Vendor Administrator only |
| Currently Sending LEDES Invoices?: | All vendor and client users | Vendor Administrator only |
| Office Size (Number of Attorneys): | All vendor and client users | Vendor Administrator only |
| Practice Areas: | All vendor and client users | Vendor Administrator only |
| Billing Information - Remittance Address | — | — |
| Street 1 to 6: | All vendor and client users | Vendor Administrator only |
| City: | All vendor and client users | Vendor Administrator only |
| Province/Region: | All vendor and client users | Vendor Administrator only |
| Zip/Postal Code: | All vendor and client users | Vendor Administrator only |
| Country: | All vendor and client users | Vendor Administrator only |

TABLE 3

User Profile

| Field | Who Can View the Field | Who Can Edit the Field |
|---|---|---|
| User ID | All vendor and client users | User, delegate of user, vendor administrator |
| Email | All vendor and client users | User, delegate of user, vendor administrator |
| First Name | All vendor and client users | User, delegate of user, vendor administrator |
| Middle Initial | All vendor and client users | User, delegate of user, vendor administrator |
| Last Name | All vendor and client users | User, delegate of user, vendor administrator |
| Position | All vendor and client users | User, delegate of user, vendor administrator |
| Vendor | All vendor and client users | User, delegate of user, vendor administrator |
| Office Name/Location | All vendor and client users | User, delegate of user, vendor administrator |
| Street 1 | All vendor and client users | User, delegate of user, vendor administrator |
| Street 2 | All vendor and client users | User, delegate of user, vendor administrator |
| City | All vendor and client users | User, delegate of user, vendor administrator |
| State | All vendor and client users | User, delegate of user, vendor administrator |
| Zip/Postal Code | All vendor and client users | User, delegate of user, vendor administrator |
| Country | All vendor and client users | User, delegate of user, vendor administrator |
| Phone | All vendor and client users | User, delegate of user, vendor administrator |
| Mobile | All vendor and client users | User, delegate of user, vendor administrator |
| Fax | All vendor and client users | User, delegate of user, vendor administrator |
| Administrative Assistant | All vendor and client users | User, delegate of user, vendor administrator |
| Bar License (Primary Country) | All vendor and client users | User, delegate of user, vendor administrator |
| Bar License (Primary State) | All vendor and client users | User, delegate of user, vendor administrator |
| Admission Year (Primary) | All vendor and client users | User, delegate of user, vendor administrator |
| License No. (Primary) | All vendor and client users | User, delegate of user, vendor administrator |
| Employment History | All vendor and client users | User, delegate of user, vendor administrator |
| Significant Transactions | All vendor and client users | User, delegate of user, vendor administrator |
| Publications | All vendor and client users | User, delegate of user, vendor administrator |
| Other Background Information | All vendor and client users | User, delegate of user, vendor administrator |
| Percentage of practice that is litigation/arbitration | All vendor and client users | User, delegate of user, vendor administrator |
| Practice Areas | All vendor and client users | User, delegate of user, vendor administrator |
| Practice Area Detail | All vendor and client users | User, delegate of user, vendor administrator |
| Birth Year | All vendor and client users | User, delegate of user, vendor administrator |
| Representative Clients | All vendor and client users | User, delegate of user, vendor administrator |
| Education | All vendor and client users | User, delegate of user, vendor administrator |
| Language(s) | All vendor and client users | User, delegate of user, vendor administrator |
| Associations/Organizations | All vendor and client users | User, delegate of user, vendor administrator |
| Vendor System Role | All vendor and client users | Vendor Administrator only |

As shown in Tables 1-3, in some embodiments the facility enables vendors to grant or deny authority of vendor users to take certain actions with respect to the vendor data (called a "vendor system role"). For example, not all vendor users can edit the fields—the vendor user must have certain administrative rights with respect to vendor data, or be editing his or her own user profile data. Table 4 below is one example of the types of vendor system roles that might be utilized in the facility. In some embodiments, the vendor system role may also affect what the vendor user may do within the clients' databases. For example, the facility may offer a vendor role for billing managers, which enables the billing manager to post an invoice to any matter, but not access the matter information. The vendor user role is itself a data element in an individual user's profile (see Table 2)

TABLE 4

| Vendor System Role | Permissions |
| --- | --- |
| Vendor Administrator | Vendor Administrators can create and delete users, and edit the vendor and office profiles. They can also post invoices to any matter to which one or more vendor users are responsible. |
| Vendor User + Billing | This is a regular vendor user, who also has the rights to post invoices to any matter. |
| Vendor User | This is the standard vendor user, who can post invoices to any matter in which the user is granted access. |
| Billing Manager | Special user role for individuals whose only responsibility is to post invoices. Billing Managers can post invoices to any matter; however, Billing Matters do not have access to the matter data. |

TABLE 5

Client-entered information shown with Vendor Profile information

| Field | Who Can View the Field | Who Can Edit the Field |
| --- | --- | --- |
| Status (i.e. whether any user at the vendor can login to the client's database) | Only client users | Company System Administrators |
| Vendor Classification | Only client users | Company System Administrators |
| Engagement Letter | Client users and vendor users | Company System Administrators |
| Default Vendor Number 1, 2, & 3 | Only client users | Company System Administrators |
| Notes | Only client users | Company System Administrators |

TABLE 6

Office Profile

| Field | Who Can View the Field | Who Can Edit the Field |
| --- | --- | --- |
| Office Vendor Number 1-3 | Only client users | Company System Administrators |
| Notes | Only client users | Company System Administrators |

TABLE 7

User Profile

| Field | Who Can View the Field | Who Can Edit the Field |
| --- | --- | --- |
| Status (i.e. whether the vendor user can login to the client's database) | Only client users | Company System Administrators |
| Notes: | Only client users | Company System Administrators |

The facility replicates vendor directory between all of the database servers, such as by using transactional database replication techniques. Such replication occurs via either the Internet 140 or a separate network (not shown). As an example of this replication, if a user of vendor 2 modified the vendor 2 entry 113 in the copy of the vendor directory 111 stored on database server 110, this modification, or "transaction," would be propagated to all other copies of the vendor directory on other database servers, such as entry 123 in vendor directory 121 on database server 120.

Each database server further contains client databases for one or more clients. For example, database server 110 contains a database 115 for client 1 and a database 118 for client 2. Each client database contains information about individual matters or projects being performed for the client by one of the registered vendors. For example, the client 1 database 115 contains an entry 116 for a matter 1a being performed for client 1 by vendor 2. It can be seen that the vendor performing a matter is identified by a pointer stored in the matter entry of the client database. For example, entry 116 in the client 1 database 115 contains a pointer to the vendor 2 entry 113 in vendor directory 111. In some embodiments, these pointers are each an identifier of either an entire entry in the vendor directory, or a field or other specific information stored inside the vendor directory entry. For example, the pointer in client database entry 116 may point to the entire vendor 2 entry 113 in the vendor directory, to a field in that entry identifying a vendor office, responsible vendor attorney, billing agent, etc. A client database entry may contain multiple pointers, each to a different point in the vendor directory. Because the client databases include client-independent vendor information "by reference," this client-independent vendor information can be shared between (1) multiple matters for the same client, such as those associated with client database records 128-130, which all point to vendor 1 in the vendor directory, and/or (2) matters of different clients such as client database entry 117 for matter 1b of client 1, client database entry 119 for matter 2a of client 2, and client database entry 126 for matter 3a of client 3, which all point to vendor 2 in the vendor directory.

In some embodiments, each client database may also contain information about the vendor or vendor users that is input by client users and is shown with the vendor information input by the vendor. This information may or may not be visible by vendor users. Table 5 shows information input by a client that is associated with the vendor profile; Table 6 shows information input by a client that is associated with the vendor office profiles; and Table 7 shows information input by a client that is associated with the vendor user profiles. This information is specific to a particular client, and is not replicated between servers.

In some embodiments, the facility may allow the client to override certain authority granted by a vendor to a vendor user. For example, a vendor may have given a vendor user the vendor system role that allows the vendor user to post invoices to any matter in which the vendor has been assigned. However, a client can specify that the status of the particular vendor user is "Inactive," which prevents the vendor user from accessing the client's database, but does not prevent the vendor user from accessing other clients' databases.

Like the vendor directory, each database server typically also contains a user credentials database that is replicated between all of the database servers. The credentials database typically includes, for both client and vendor users, user access information, such as names, passwords, and access rights for each such user. Users associated either with a client or a vendor may connect to one or more of the database servers via the Internet 140 or another network. Users may connect to the database servers using a web browser and/or various other types of client software.

In some embodiments, the facility initially routes a client user to a randomly-selected database server, where user access information stored in the local copy of the credentials database is used to authenticate the user. Typically this database server then redirects the client user to the database server containing the client database for that client. For example, user 1 of client 1, using user computer system 151, would be routed to database server 110 containing client database 115 for client 1. Database server 110 would use access information for client 1 stored in the client 1 database 115 to authenticate user 1 of client 1. User 1 of client 1 would then proceed to interact with the contents of the client 1 database, such as by modifying a matter entry in the client 1 database, approving the payment of a bill presented to client 1 via the service by a vendor assigned to one of client 1's matters, or creating and populating a new matter entry in the client 1 database—including assigning a vendor and/or a vendor user to the new matter.

In some embodiments, the facility directs a vendor user to a randomly-selected database server, where user access information stored in the local copy of the credentials database is used to authenticate the user. Depending on the vendor user's vendor system rights and rights within a particular client's database, the vendor user may then access or modify information in the vendor's entry in the vendor directory, and/or selected information in client database entries for matters assigned to the vendor, such as presenting a bill in such a matter. Where a vendor user wishes to access client information for a client whose database is stored on a database server other than the one to which the vendor user is logged in, the facility in some embodiments redirects the vendor user to log in at the other database server. In some embodiments, however, the facility forwards the vendor user's data access requests from the database server to which the vendor user is logged in to the database server on which the requested data resides. The facility may use various mechanisms to direct users to the proper database server, including web front-ends containing server-side logic, client applications containing client-side logic, load-balancing equipment and/or techniques, or other forms of redirectors. In some embodiments, rather than selecting a database server randomly for a vendor user, the facility employs logic to choose a database server most likely to be directly useful to a vendor or particular vendor user, such as the database server hosting the largest number of clients or matters to which the vendor or vendor user is assigned, the database server containing most recently accessed by the vendor or vendor user, etc.

In some embodiments, the facility generates reports and/or views for particular vendors across multiple database servers. For example, for a user of vendor 2, the facility may generate a report or view that contains information from client database entry 116 for matter 1*a* for client 1 in database server 110 and client database entry 126 for matter 3*a* for client 3 in client database 125 on database server 120. The report may indicate, for example, action items that are now or will soon be due in any of the matters for which the vendor user is responsible. In some embodiments that do not permit cross-client database queries, such reports are or may be generated periodically from each client's database (i.e. a routine is run within each client's database that pushes the vendor specific data into the vendor database. In some other embodiments the reports might be generated dynamically, so that they contain the most up-to-date version of the information that is available. Such reports may be initiated based either on retrievals by an agent outside of the relevant databases, or on data exports from the relevant databases. In some embodiments, the facility generates such reports based upon queries specified by the operator of the ASP service, and not in accordance with any query specified by a vendor or client user.

In some embodiments, a vendor user may add to his or her vendor's vendor directory entry information specifying a designee who may take actions on behalf of the vendor user. In some cases, where a matter entry contains a pointer to a vendor user inside a vendor entry in the vendor directory, and that vendor user specifies a designee, that designee receives some or all of the authority granted to the responsible vendor user for the matter. For example, such a designee may be permitted to submit invoices, or update matter status information. Some authority may be withheld from the designee, however, at the instigation of the responsible vendor user, an administrative vendor user for the same vendor, an administrative user for the client, or an agent of the service.

Those skilled in the art will appreciate that FIG. 1 is abbreviated in a number of ways for the sake of comprehensibility, including limiting the number of user computer systems; database servers; vendors, clients, matters, and associated information shown. Those skilled in the art will appreciate that, in an actual implementation of the facility, any of these could be significantly larger than shown.

While various functionalities and data are shown in FIG. 1 as residing on particular computer systems that are arranged in a particular way, those skilled in the art will appreciate that such functionalities and data may be distributed in various other ways across computer systems in different arrangements.

Figure 2:
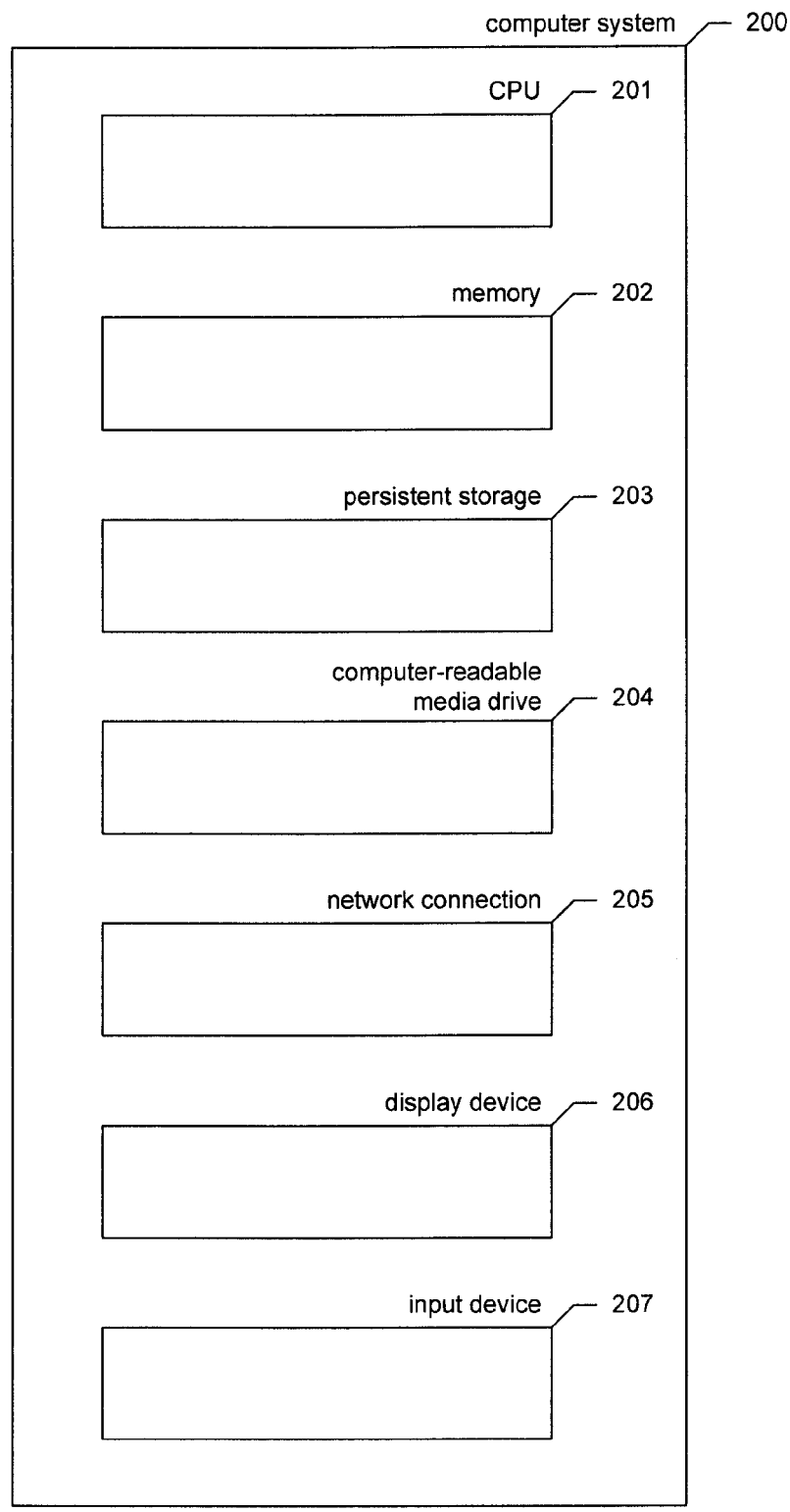
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; a network connection 205 for connecting the computer system to other computer systems, such as via the Internet, to exchange programs and/or data—including data structures; a display device 206 for visually displaying information; and an input device 207 such as a keyboard, a mouse or other pointing device, or a microphone for inputting information. While computer systems configured as described above are typically used to support the operation of the facility, one of ordinary skill in the art will appreciate that the facility may be implemented using devices of various types and configurations, and having various components.

In order to more fully describe the facility and its implementation, the number of display diagrams showing sample displays presented by the facility are discussed below. While these figures and their discussion include law firms as an example of a type of vendor and companies as an example of a type of client, those skilled in the art will appreciate that the facility may be used in connection with vendors of other types and/or with clients of other types.

Figure 3:
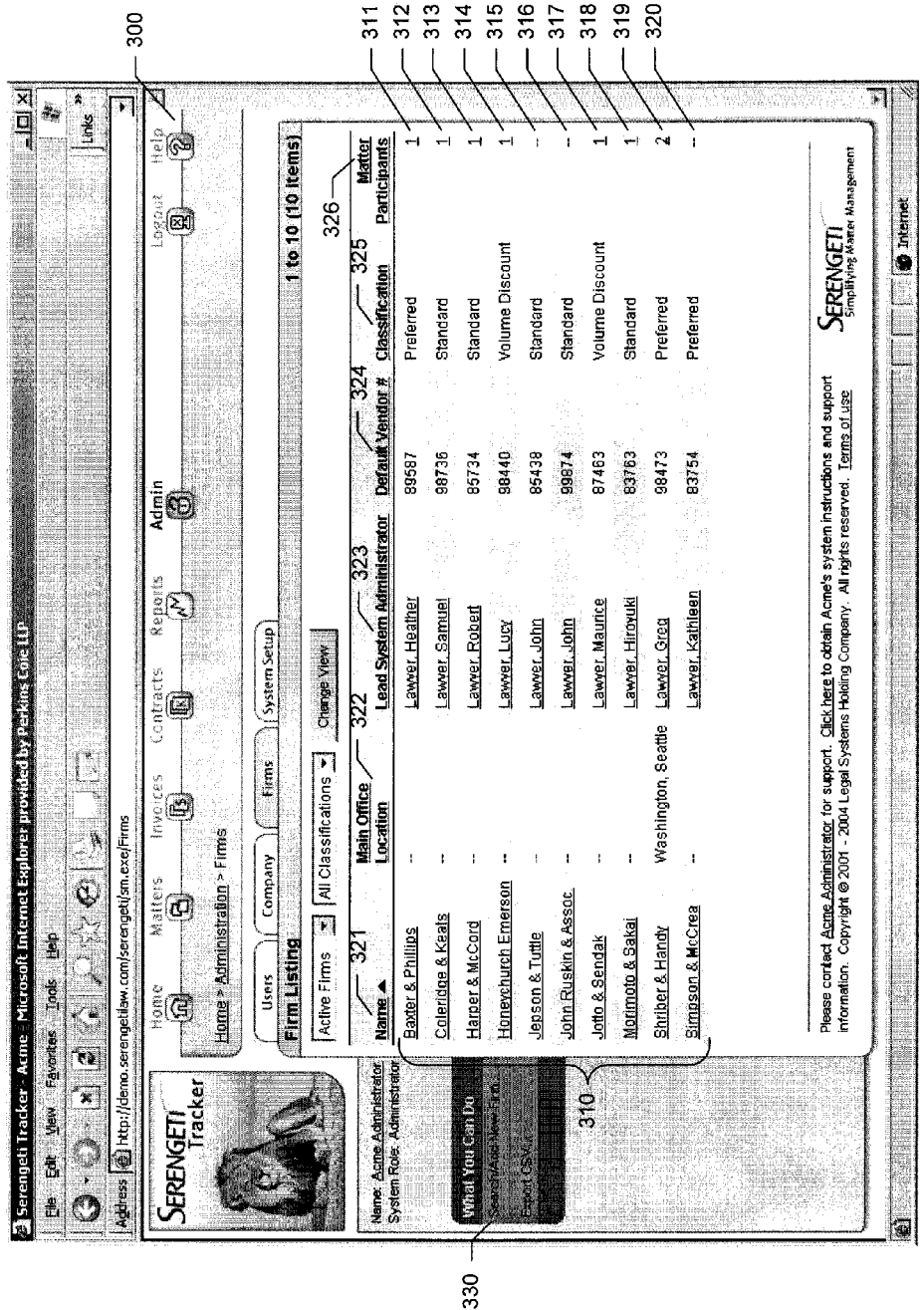
FIG. 3 is a display diagram showing a sample display presented by the facility containing a list of firms initially associated with a sample client.

FIGS. 3-8 illustrate displaying firms already present in the vendor directory. FIG. 3 is a display diagram showing a sample display presented by the facility containing a list of firms initially associated with a sample client. In particular, the display 300 includes a list 310 of law firms currently associated with a sample company called Acme. The list is comprised of entries 311-320, each corresponding to a different firm associated with the Acme company. Each entry is comprised of a number of fields, including a name field 321, a main office location field 322, a lead system administrator field 323, a default vendor number column 324, a classification column 325, and a matter participants column 326. In order to select one of the firms in the list, the user may click on or otherwise select the firm's name in the name column. In order to search for a firm not included in list 310, the user may click on or otherwise select control 330.

Figure 4:
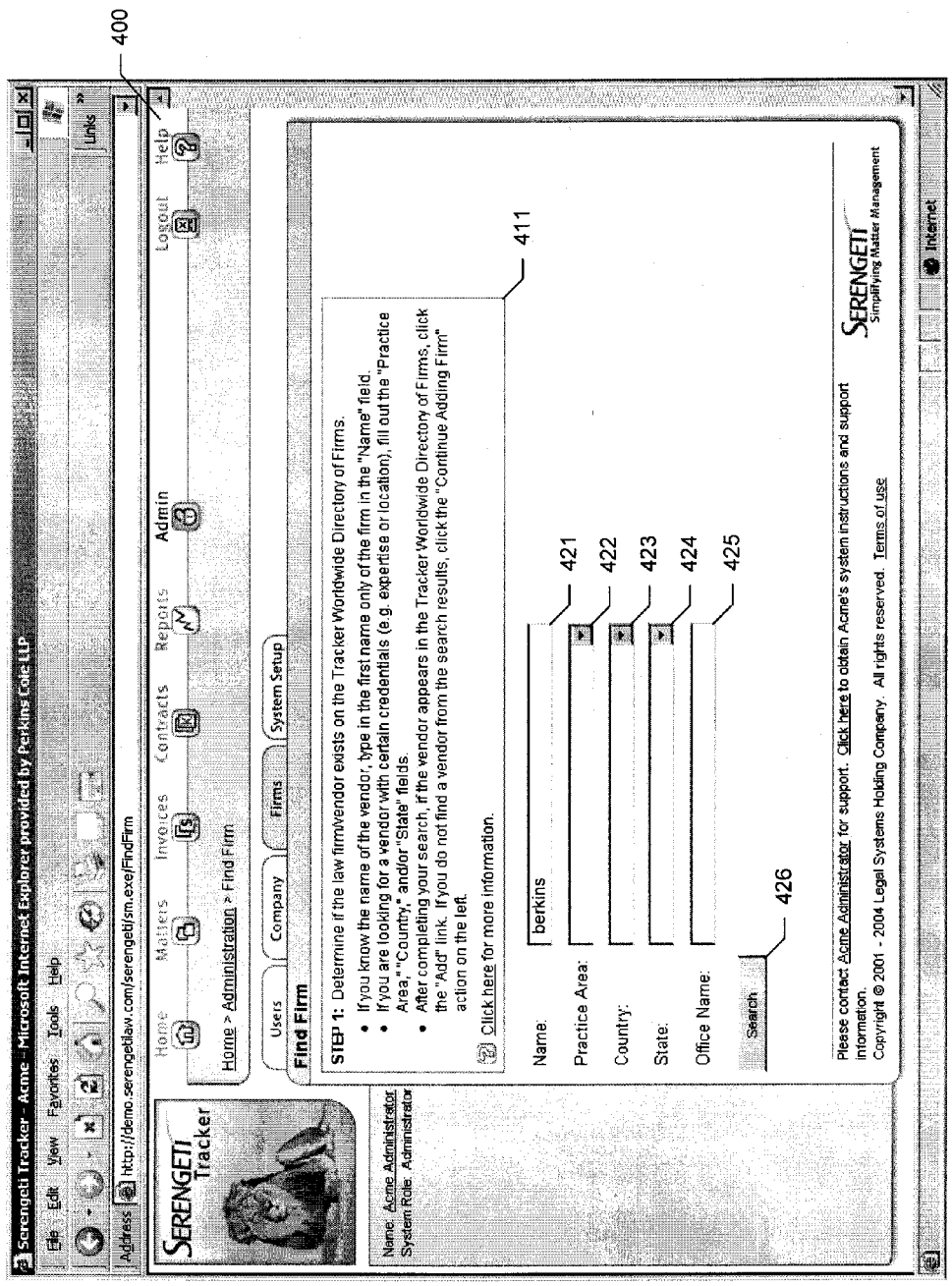
FIG. 4 is a display diagram showing a sample display presented by the facility containing a set of search fields that the user may use in order to search for a firm not in the list of associated firms.

FIG. 4 is a display diagram showing a sample display presented by the facility containing a set of search fields that the user may use in order to search for a firm not in the list of associated firms. The display 400 may be displayed in response to the user clicking on control 330 in FIG. 3. The user may enter information corresponding to the searched-for firm in a number of fields, including a name field 421, a practice area field 422, a country field 423, a state field 424, and an office name field 425. In various embodiments, the facility may include additional or different fields in display 400. After entering such information into these fields, the user may click on or otherwise select control 426 in order to perform a search.

Figure 5:
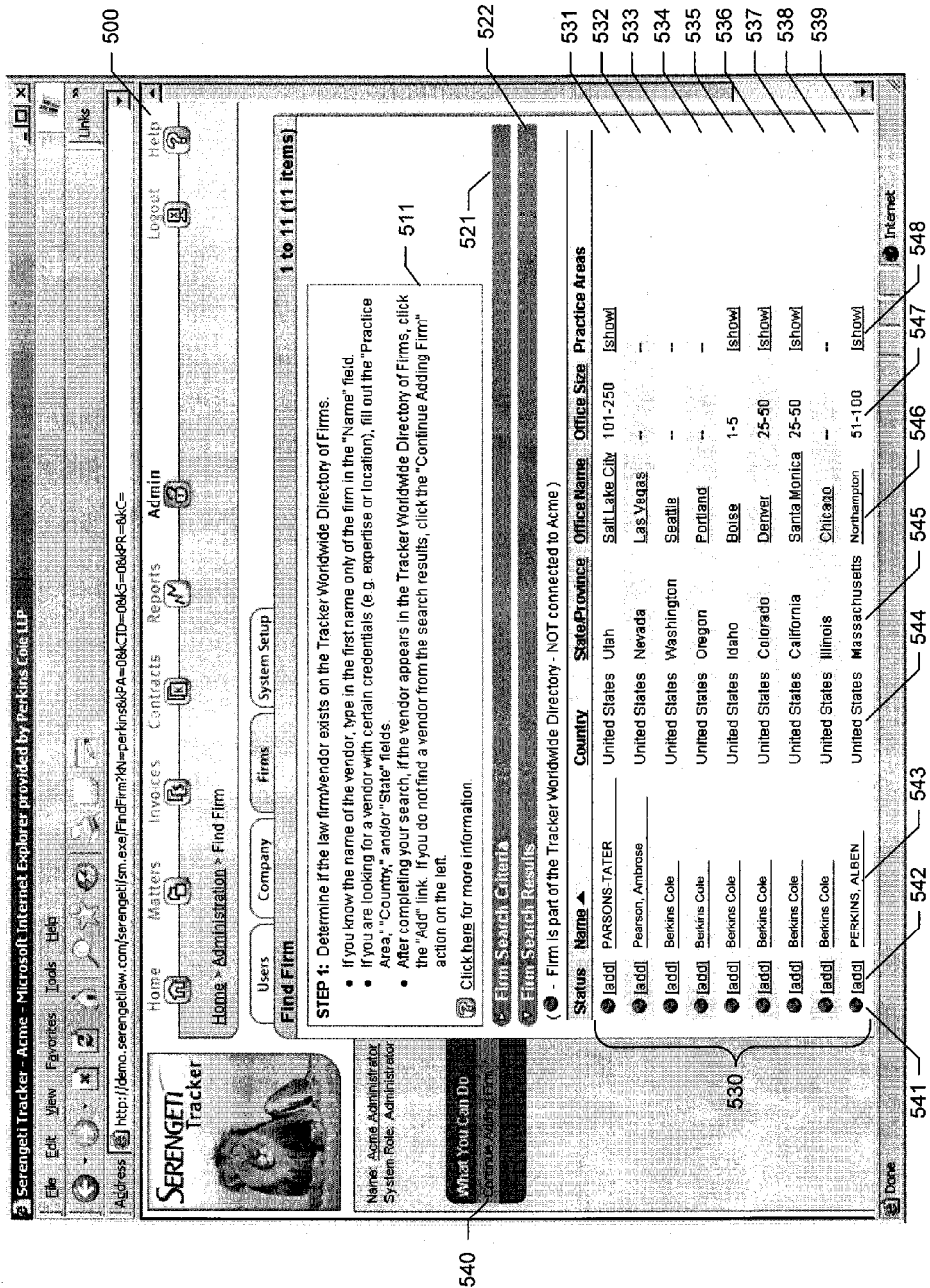
FIG. 5 is a display diagram showing a sample display presented by the facility containing a view of firms in the vendor directory satisfying the search.

FIG. 5 is a display diagram showing a sample display presented by the facility containing a view of firms in the vendor directory satisfying the search. In some embodiments, fuzzy search techniques are used to identify firms that, while not strictly satisfying the search criteria specified in FIG. 4, come close to satisfying the search criteria. In some embodiments, the facility displays display 500 in response to the user clicking on control 426 in FIG. 4. The display 500 includes instructions 511 for using the display, an expandable firm search criteria section 521 that can be expanded to show information specified in FIG. 4, and a firm search results section 522. The firm search results section includes a list 530 of entries 531-539, each corresponding to a firm or firm office satisfying the query. Each entry contains columns such as a vendor directory column 541 showing whether the firm is already associated with the client or whether the firm is only in the vendor directory; an add column 542 that may be used to add the firm or firm office to the list of firms associated with the company; a name column 543; a country column 544; a state/province column 545; an office name column 546; an office size column 547; and a practice areas column 548. The user may click on or otherwise select a firm's name to see its profile, the show indication in a firm's practice areas column to show the firm's practice areas, or the add indication in a firm's status column in order to add the firm to the company's list of associated firms. The user may click on or otherwise select control 540 in order to add a firm that is not in the vendor directory.

Figure 6:
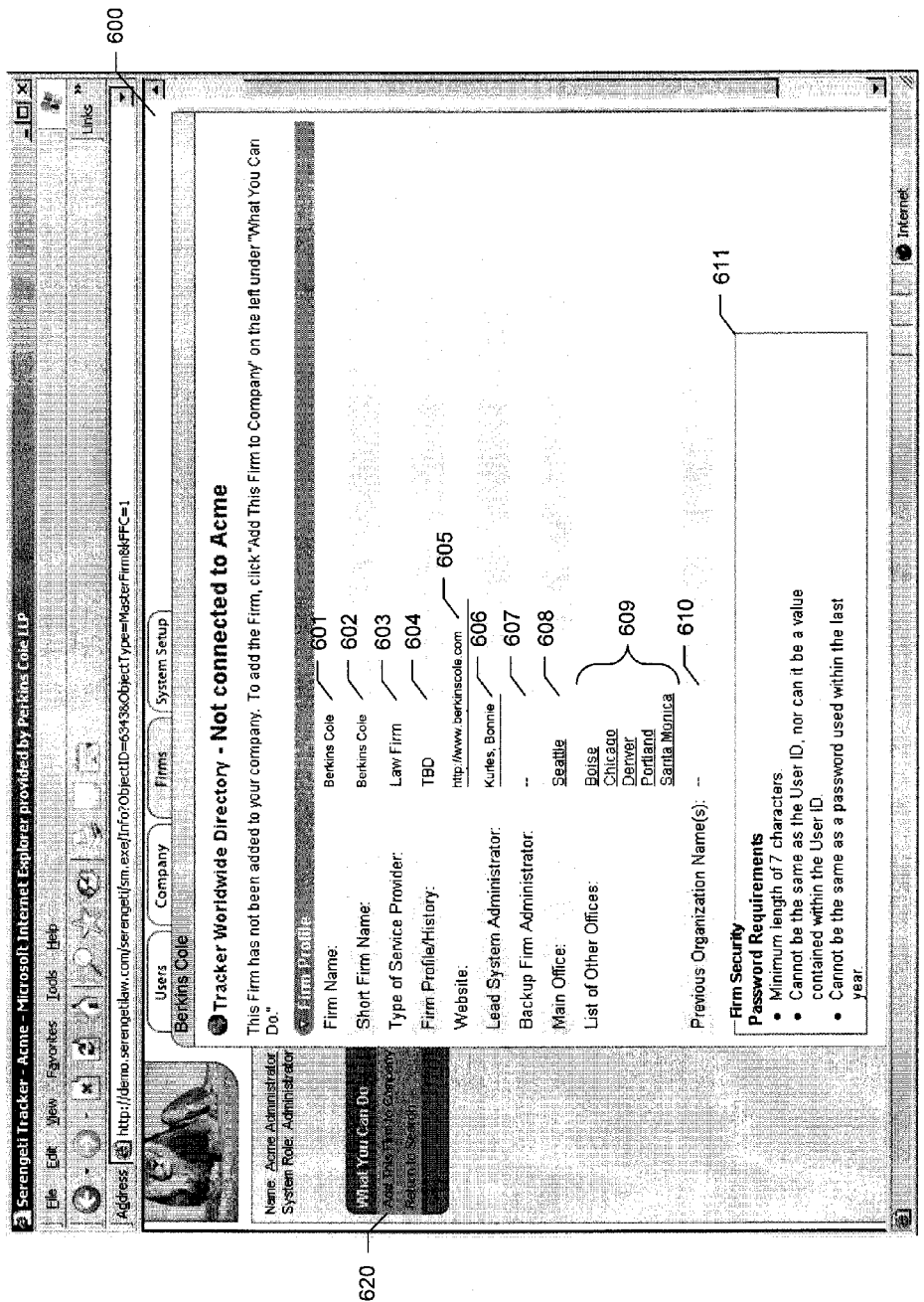
FIG. 6 is a display diagram showing a sample display presented by the facility containing a sample firm profile displayed by clicking on the intersection of column 543 and entry 533 in FIG. 5.

FIG. 6 is a display diagram showing a sample display presented by the facility containing a sample firm profile displayed in response to the user clicking on the intersection of column 543 and entry 533 in FIG. 5. The firm profile includes fields such as the following: a firm name field 601, a short firm name field 602, a service provider type field 603, a firm profile/history field 604, a web site field 605, a lead system administrator field 606, a backup firm administrator field 607, a main office field 608, a list of other offices field 609, a previous organization name field 610, and firm security standard 611. The user may click control 620 to add this firm to the Acme company's list of associated firms.

Figure 7:
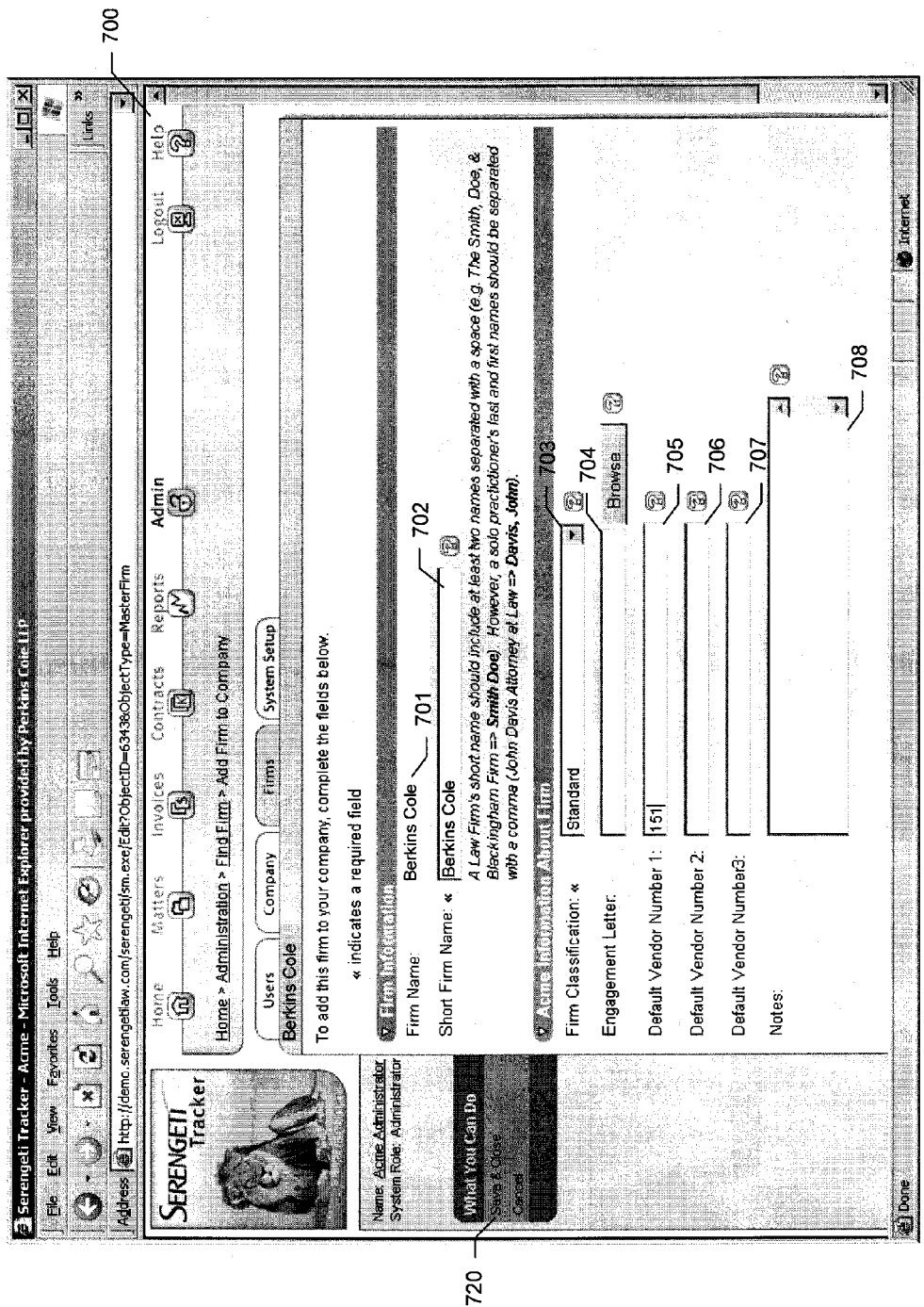
FIG. 7 is a display diagram showing a sample display presented by the facility containing a form usable by a company user to add a firm in the vendor directory to the list of firms associated with the company.

FIG. 7 is a display diagram showing a sample display presented by the facility containing a form usable by a company user to add a firm in the vendor directory to the list of firms associated with the company. The display 700 may be displayed in response to the user clicking on the intersection of column 542 and entry 533 in FIG. 5, or by clicking on control 620 in FIG. 6. The display includes the name of the firm 701, as well as fields such as the following for entering information about the company's engagement of the firm: a short firm name field 702 into which the user may enter a short firm name by which the firm will be known to the company; a firm classification field 703; an engagement letter field 704; default vendor number field 705-707; and a notes field 708. After entering some or all of this information, the user can click on or otherwise select control 720 to save the information and add the firm to the list of firms associated with the company.

Figure 8:
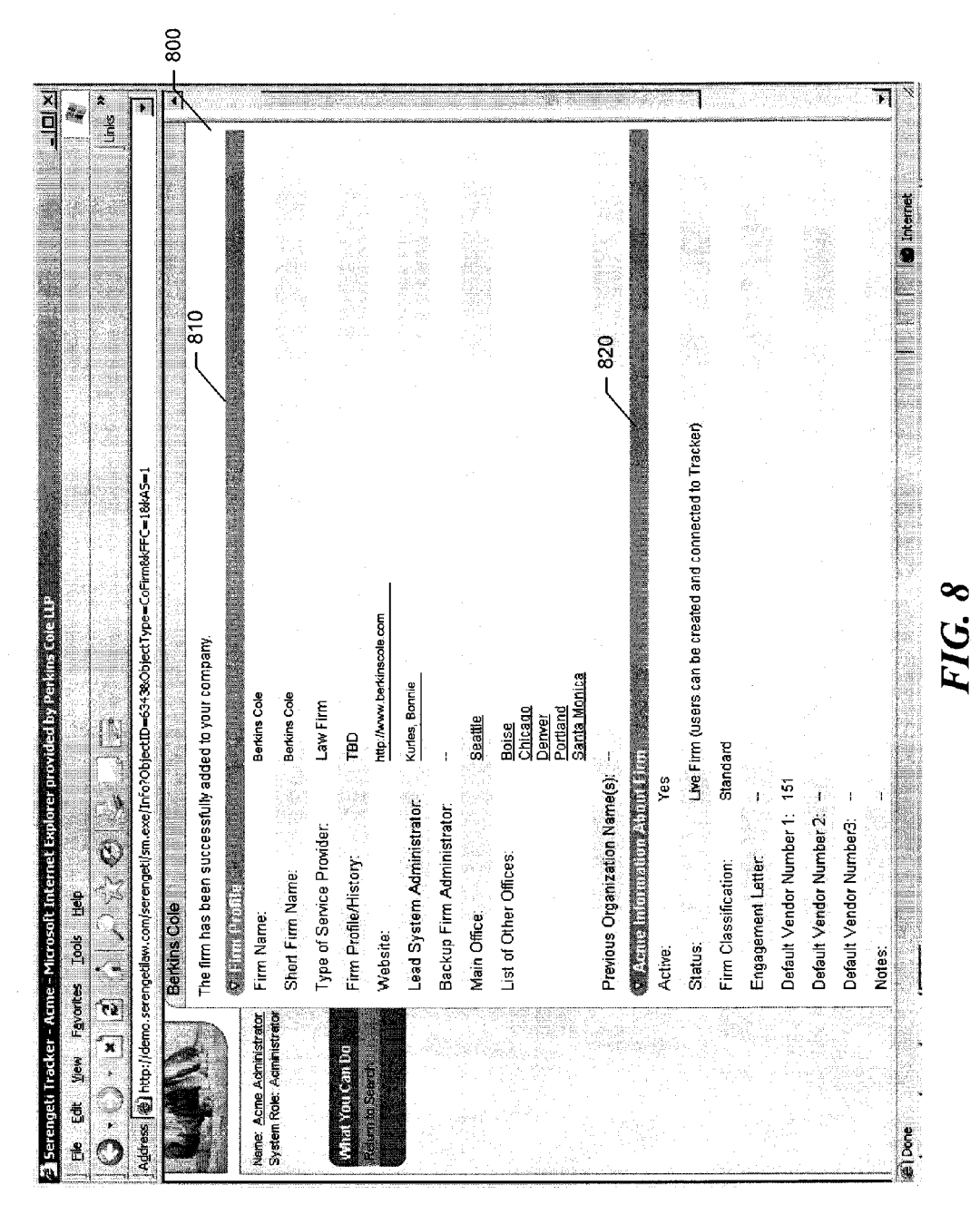

FIG. 8 is a display diagram showing a sample display presented by the facility containing information relating to the addition of the firm to the list of firms associated with the company. The display 800 may be displayed in response to the user clicking on control 720 shown in FIG. 7. The display 800 includes a firm profile section 810 containing information about the firm that is invariant across clients, as well as section 820 containing information specific to the company's engagement of the firm, such as the information inputted in FIG. 7.

Figure 9:
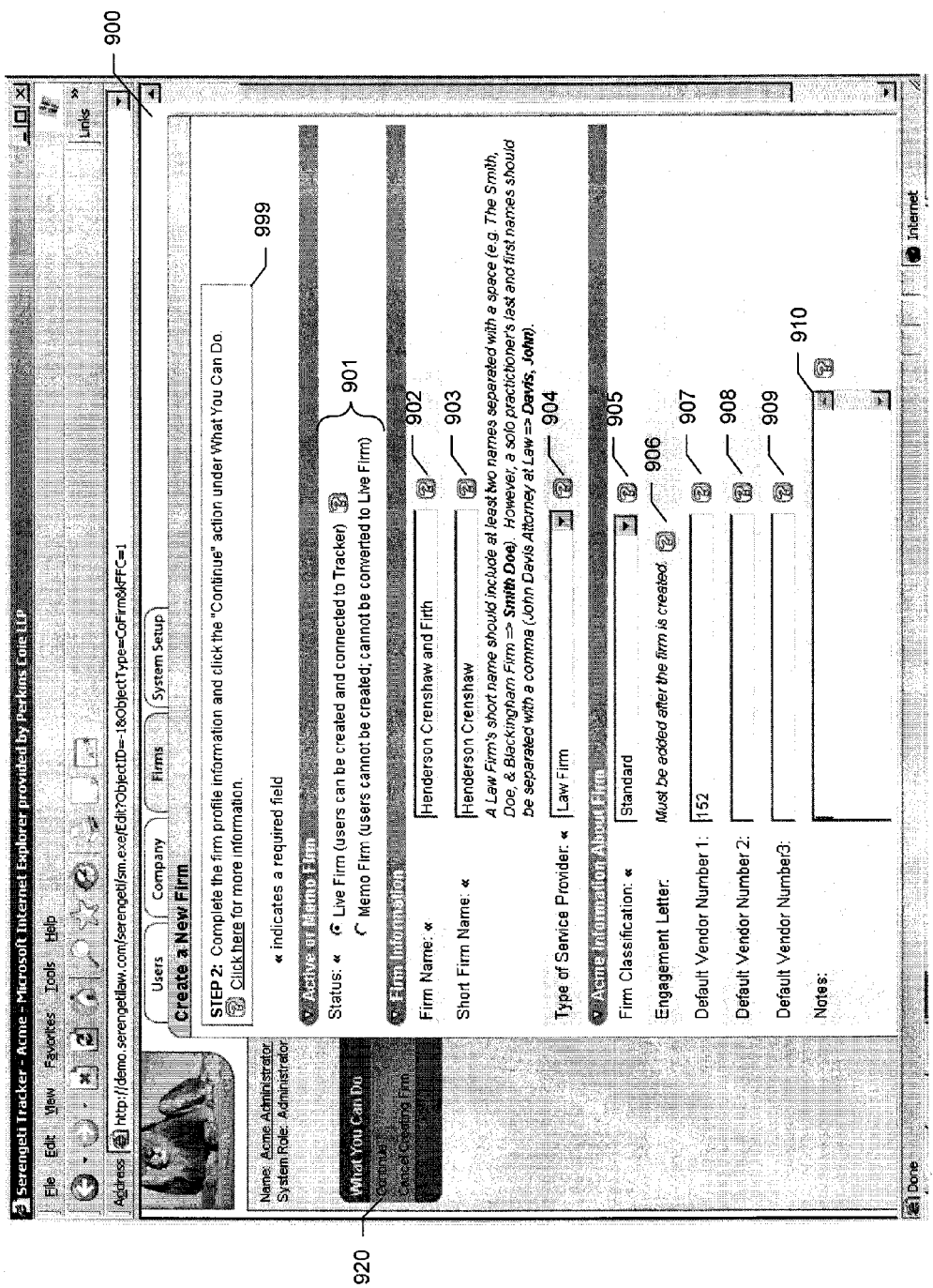
FIG. 9 is a display diagram showing a sample display presented by the facility containing a form for adding a firm not listed in the vendor directory.

If a company user wishes to associate with his or her company a firm not listed in the vendor directory, the user can click on or otherwise select control 540 in FIG. 5. FIGS. 9-12 illustrate associating a company with a firm not listed in the vendor directory. FIG. 9 is a display diagram showing a sample display presented by the facility containing a form for adding a firm not listed in the vendor directory. The display 900 contains fields into which the company or user may enter information about the firm to be created, including a status field 901, a firm name field 902, a short firm name field 903, a type of service provider field 904, a firm classification field 905, an engagement letter field 906, default vendor number fields 907-909, and a notes field 910. After entering some or all of this information, the user may click on or otherwise select control 920 to continue adding the firm.

Figure 10:
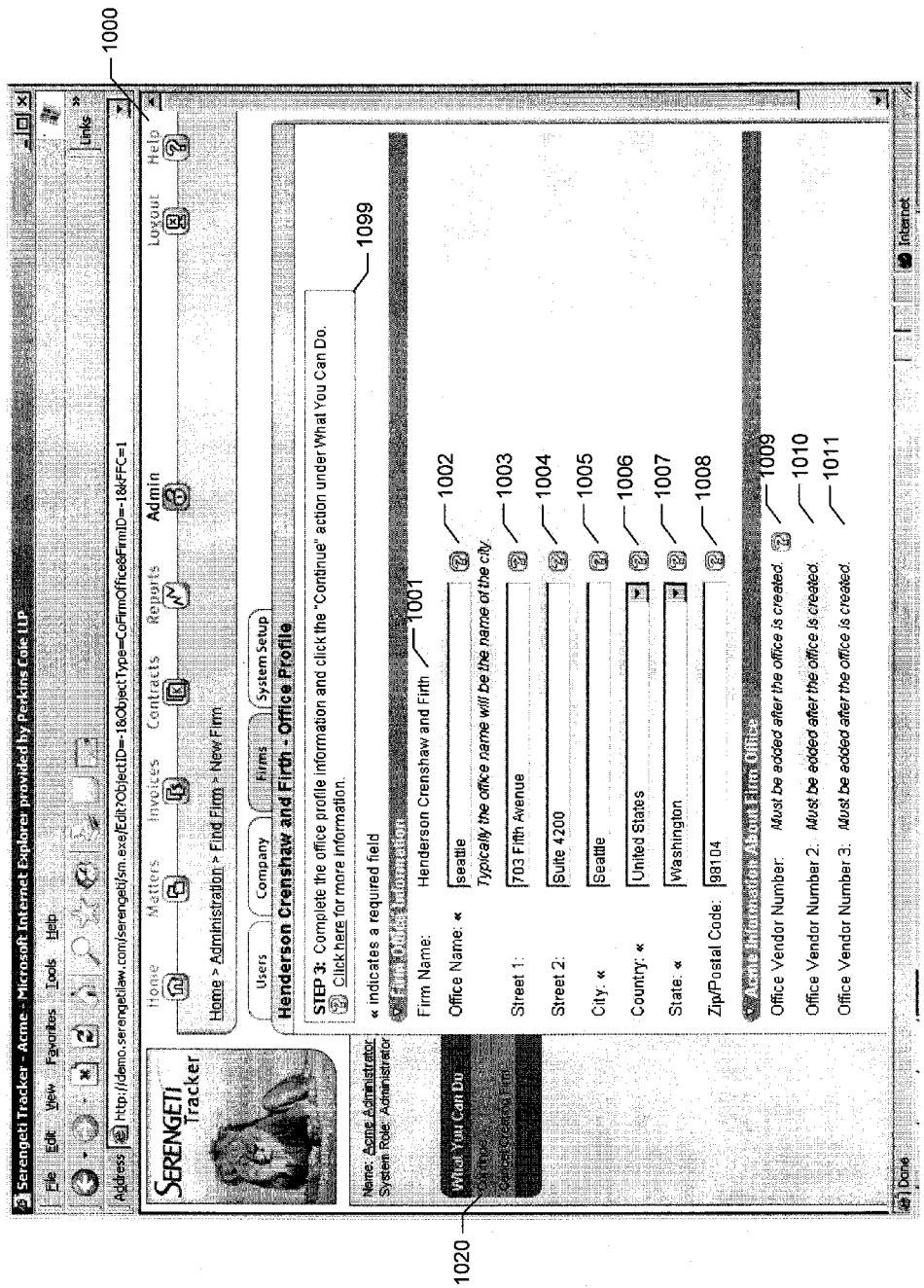
FIG. 10 is a display diagram showing a sample display presented by the facility containing a form for creating an office profile.

FIG. 10 is a display diagram showing a sample display presented by the facility containing a form for creating an office profile. In some embodiments, the facility displays the display 1000 in response to the user clicking on control 920 in FIG. 9. The display 1000 includes the name of the firm 1001, as well as fields for entering information about an office of the firm, such as: an office name field 1002, street fields 1003-1004, a city field 1005, a country field 1006, a state field 1007, and a zip/postal code field 1008, as well as office vendor fields 1009-1011. After entering some or all of this information, the user may click on or otherwise select control 1020 to continue adding the firm.

Figure 11:
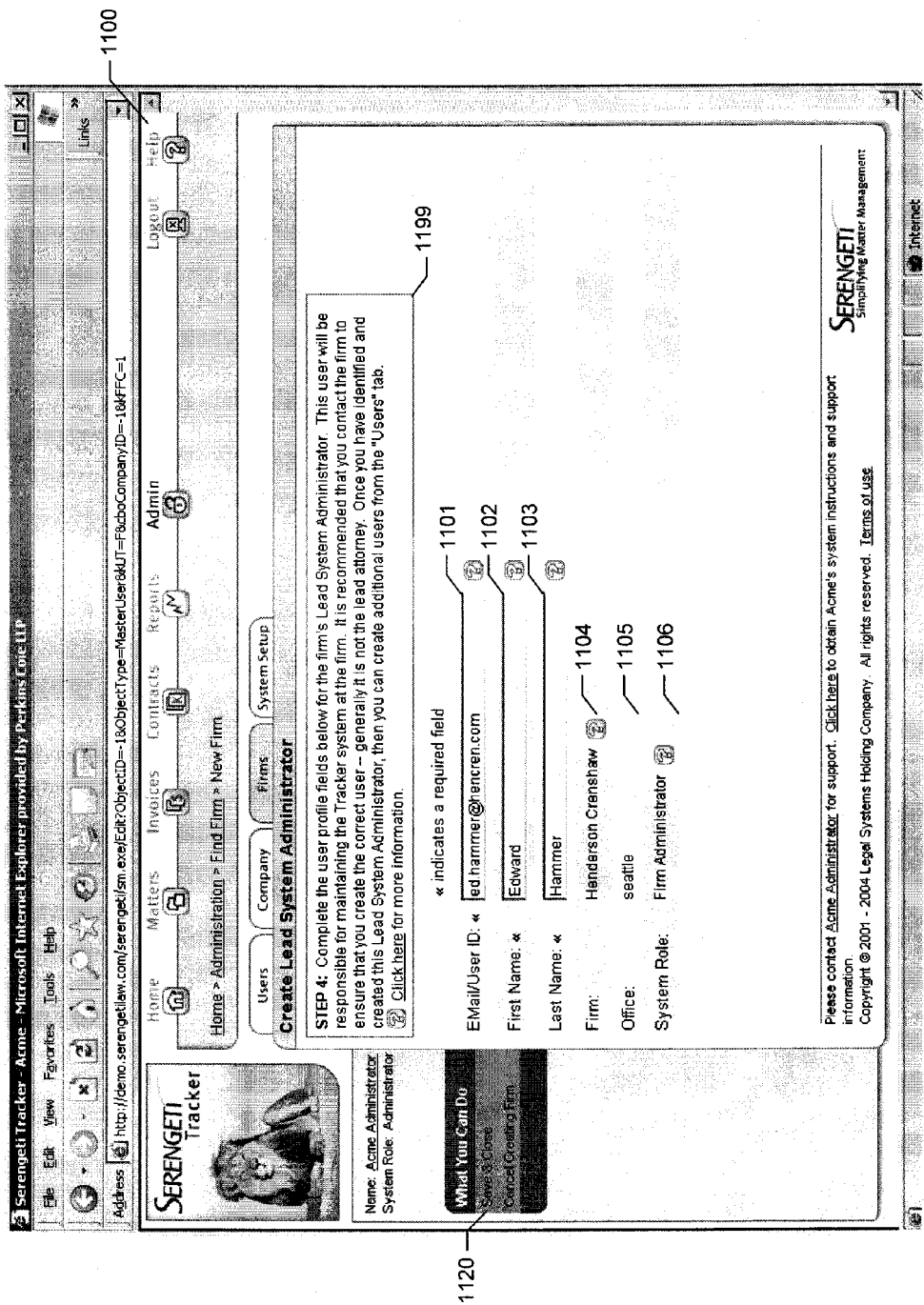
FIG. 11 is a display diagram showing a sample display presented by the facility containing a form for entering firm lead system administrator information.

FIG. 11 is a display diagram showing a sample display presented by the facility containing a form for entering firm lead system administrator information. In some embodiments, the facility displays the display 1100 in response to the user clicking on control 1020 shown in FIG. 10. The display 1100 includes instructions 1199 regarding entering information about a lead system administrator for the firm, including fields such as the following: an e-mail/user ID field 1101, a first name field 1102, and a last name field 1103. The display further includes an indication of the firm name 1104, the firm office 1105, and the role 1106 of this user. After entering some or all of this information, the user may click control 1120 to finish adding the firm.

Figure 12:
FIG. 12 is a display diagram showing a sample display presented by the facility containing a firm profile for the new firm created by the company.

FIG. 12 is a display diagram showing a sample display presented by the facility containing a firm profile for the new firm created by the company. In some embodiments, the facility presents the display 1200 in response to the user clicking on control 1120 shown in FIG. 11. The display 1200 is similar to the firm profile shown in FIG. 8 and discussed in conjunction therewith, and includes information received in connection with the displays shown in FIGS. 9-11.

In some embodiments, when a company user creates a new firm and creates a lead system administrator for that firm, the facility automatically contacts that lead system administrator—such as by sending an e-mail message to the e-mail address specified for the lead system administrator—inviting the lead system administrator to visit a web site provided by the facility to enter additional information about the created firm. In some embodiments, this communication includes a link to a login page for such a web site, as well as a password generated for the lead system administrator.

Figure 13:
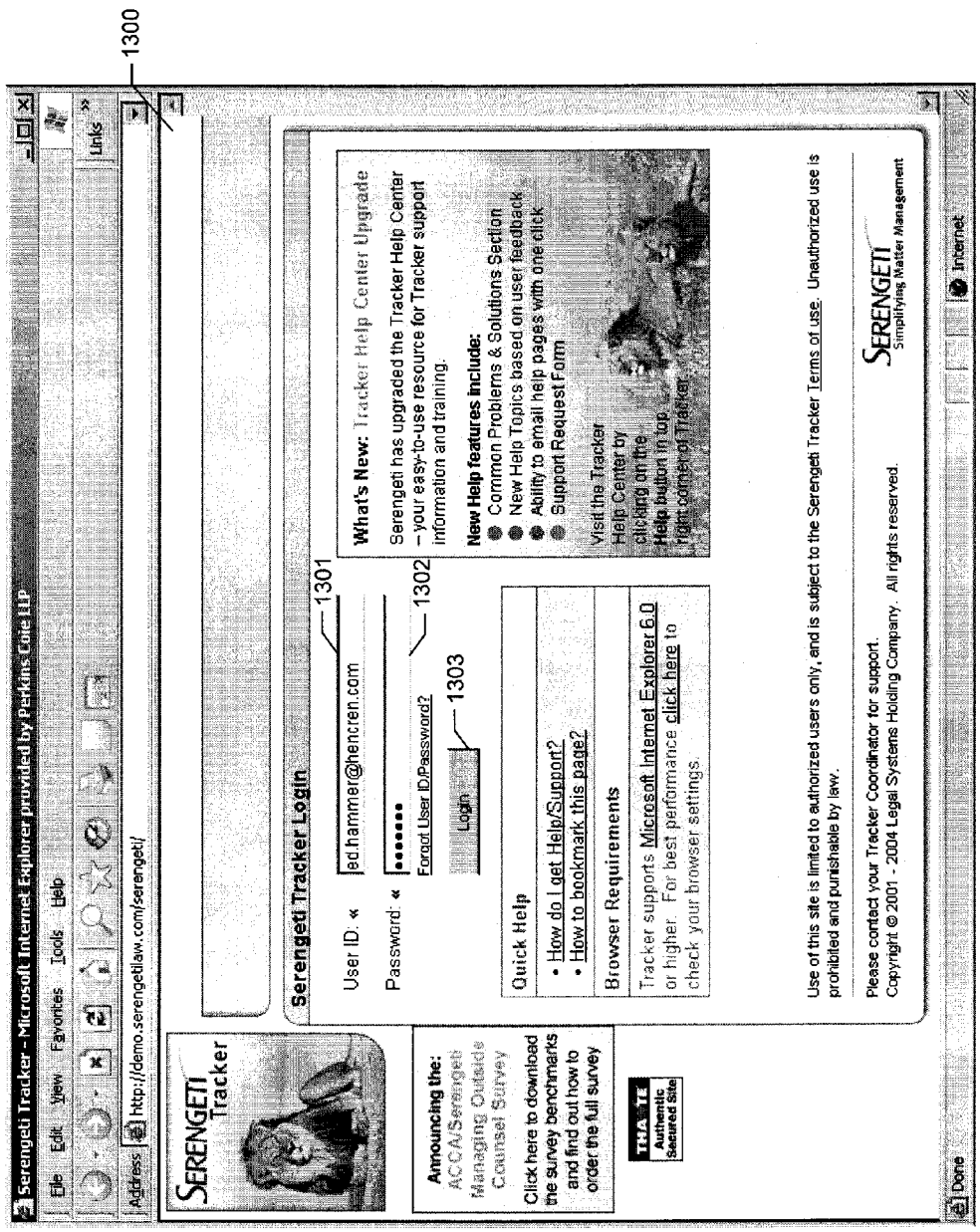
FIG. 13 is a display diagram showing a sample display presented by the facility containing a login screen displayed to the lead system administrator.

FIG. 13 is a display diagram showing a sample display presented by the facility containing a login page displayed to the lead system administrator. In some embodiments, the display 1300 is displayed in response to the lead system administrator following a link provided in the communication. The login screen includes fields into which the lead system administrator may enter authentication information, including a user ID field 1301 and a password field 1302. After entering this information, the user can click control 1303 to continue.

Figure 14:
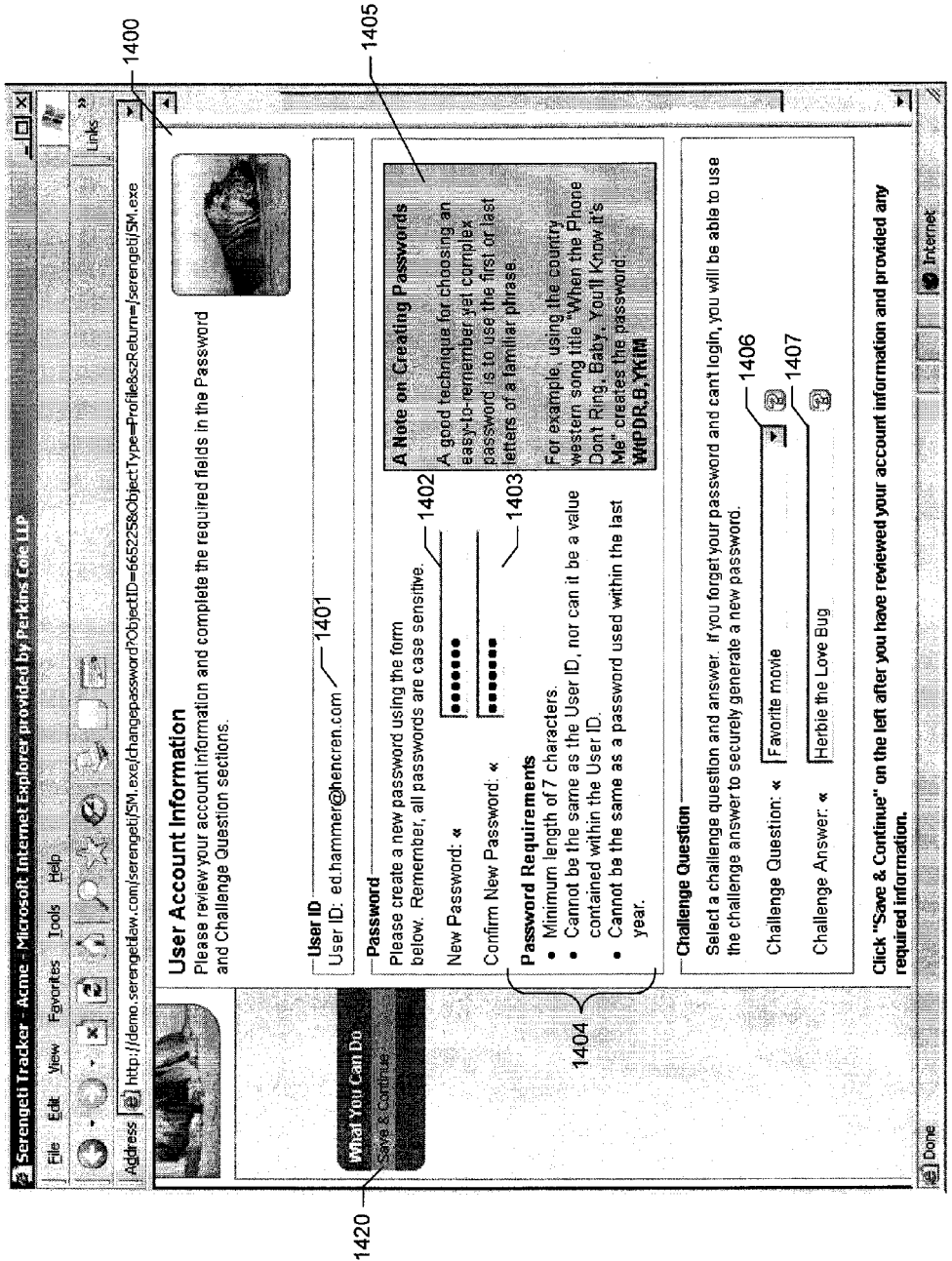
FIG. 14 is a display diagram showing a sample display presented by the facility containing a form for revising the user credentials for the lead system administrator.

FIG. 14 is a display diagram showing a sample display presented by the facility containing a form for revising the user credentials for the lead system administrator. In some embodiments, the display 1400 is displayed in response to the user clicking on control 1303 shown in FIG. 13. The display 1400 includes the user ID 1401 for the lead system administrator, as well as fields such as the following: a new password field 1402, a confirmed new password field 1403, a challenge question field 1406, and a challenge answer field 1407, as well as password requirements 1404 and password creation instructions 1405. After entering this information, the user can click on or otherwise select control 1420 to continue.

Figure 15:
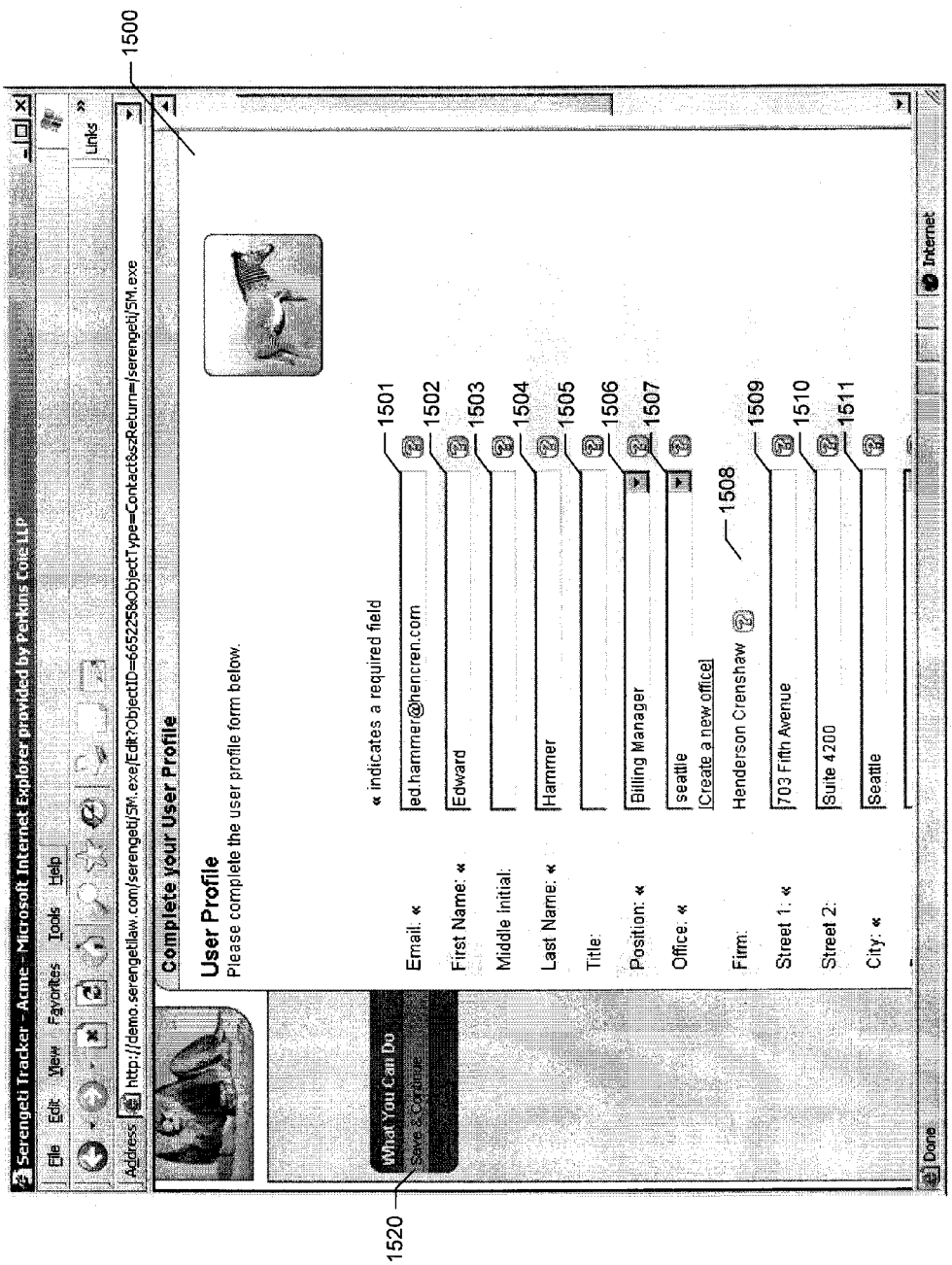
FIG. 15 is a display diagram showing a sample display presented by the facility containing a form for completing the lead system administrator's user profile.

FIG. 15 is a display diagram showing a sample display presented by the facility containing a form for completing the lead system administrator's user profile. In some embodiments, the facility displays the display 1500 in response to the user clicking on control 1420 shown in FIG. 14. The display 1500 includes fields, such as an e-mail field 1501, a first name field 1502, a middle initial field 1503, a last name field 1504, a title field 1505, a position field 1506, an office field 1507, a firm field 1508, street fields 1509-1510, and a city field 1511. After entering some or all of this information, the user may click on or otherwise select control 1520 to continue.

Figure 16:
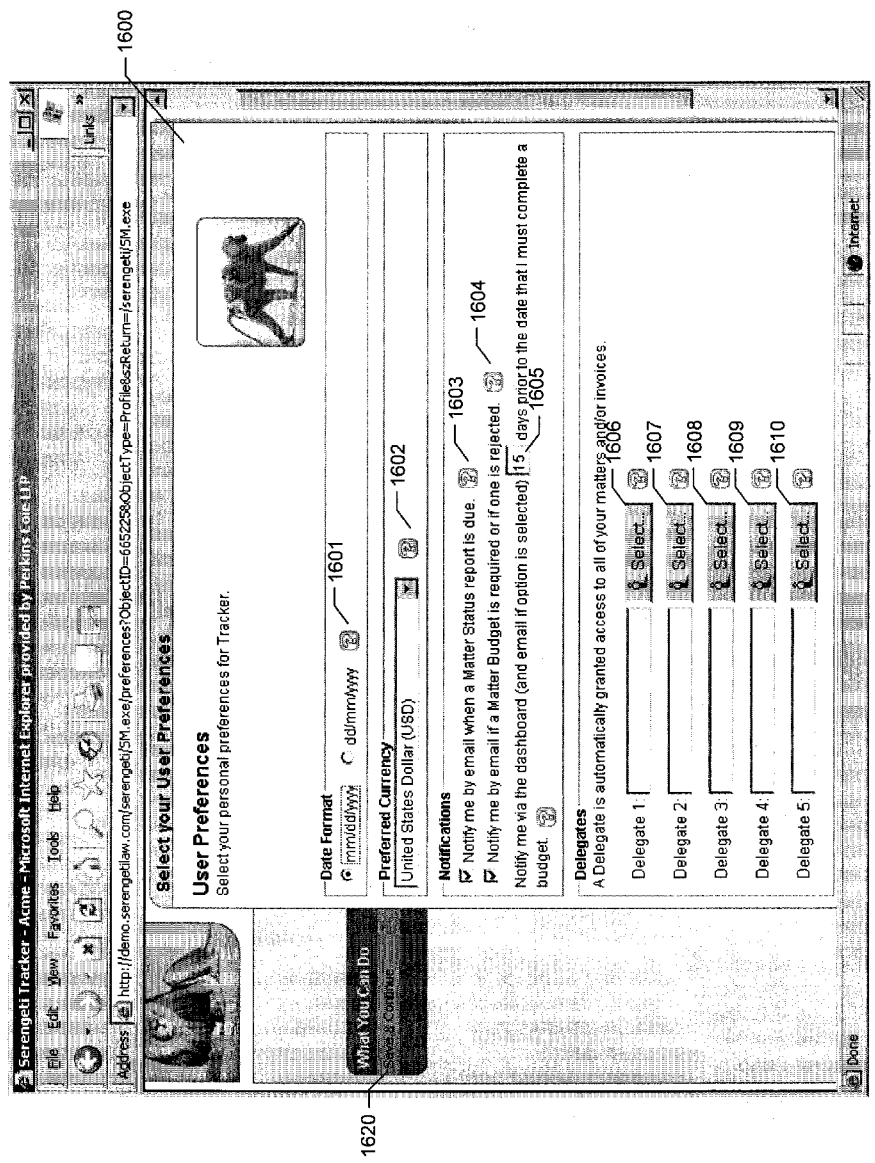
FIG. 16 is a display diagram showing a sample display presented by the facility containing a user preferences form for the lead system administrator.

FIG. 16 is a display diagram showing a sample display presented by the facility containing a user preferences form for the lead system administrator. In some embodiments, the facility presents the display 1600 in response to the user clicking on control 1520 shown in FIG. 15. The display 1600 includes fields, such as a date format field 1601, a preferred currency field 1602, a matter status report notification field 1603, a matter budget notification field 1604, a budget notification field 1605, and delegate fields 1606-1610. After entering some or all of this information, the user may click on or otherwise select control 1620 to continue.

FIG. 17 is a display diagram showing a sample display presented by the facility containing a form for entering firm information for inclusion in the vendor directory. In some embodiments, the facility presents the display 1700 in response to the user clicking on control 1620 shown in FIG. 16. The display 1700 includes fields, such as: a firm name field 1701, a short firm name field 1702, a service provider type 1703, a firm profile/history field 1704, a web site field 1705, a main office field 1706, a previous organization name field 1707, and a lead system administrator field 1708. After entering some or all of this information, the user can click on or otherwise select control 1720 to continue.

Figure 18A:
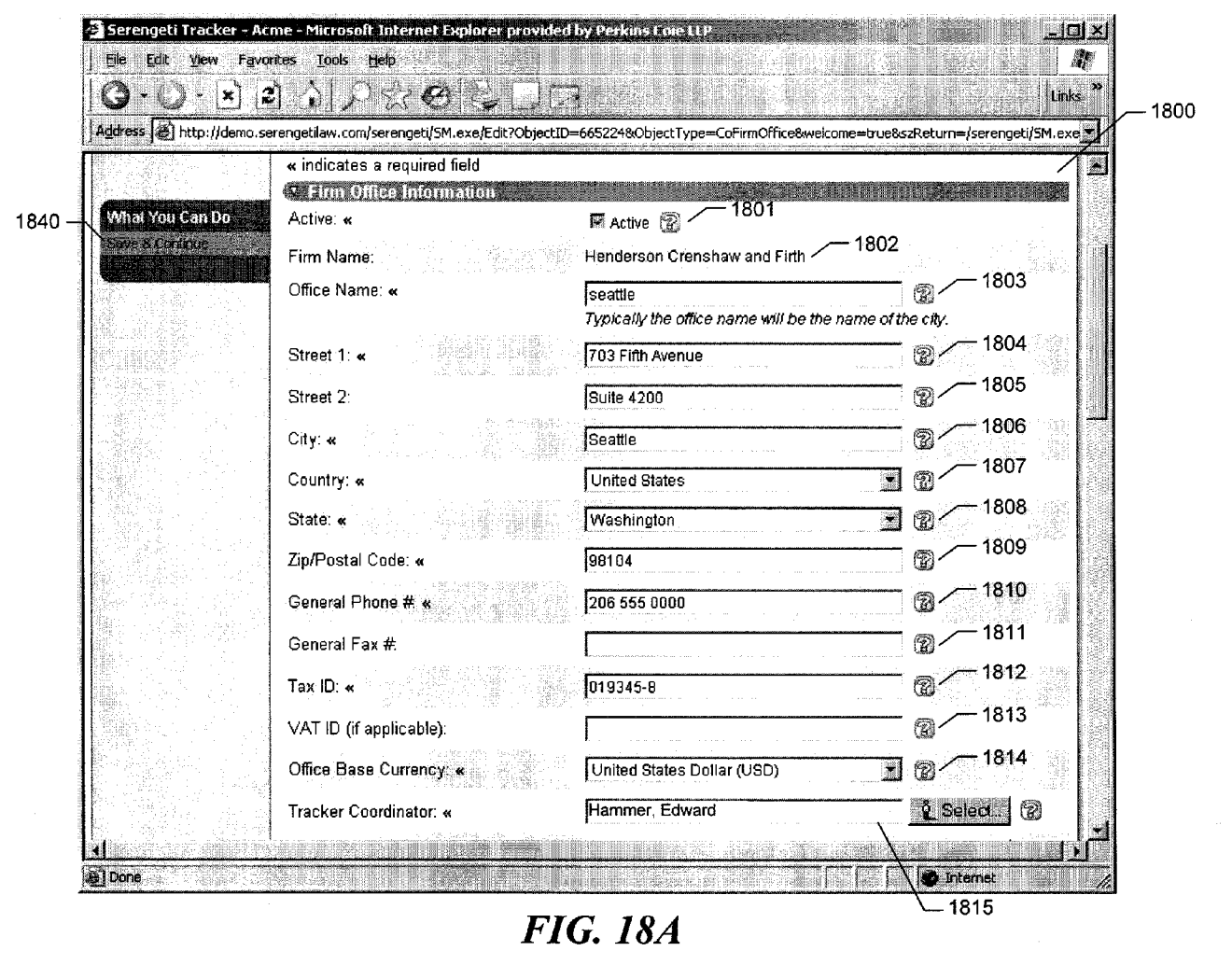
Figure 18B:
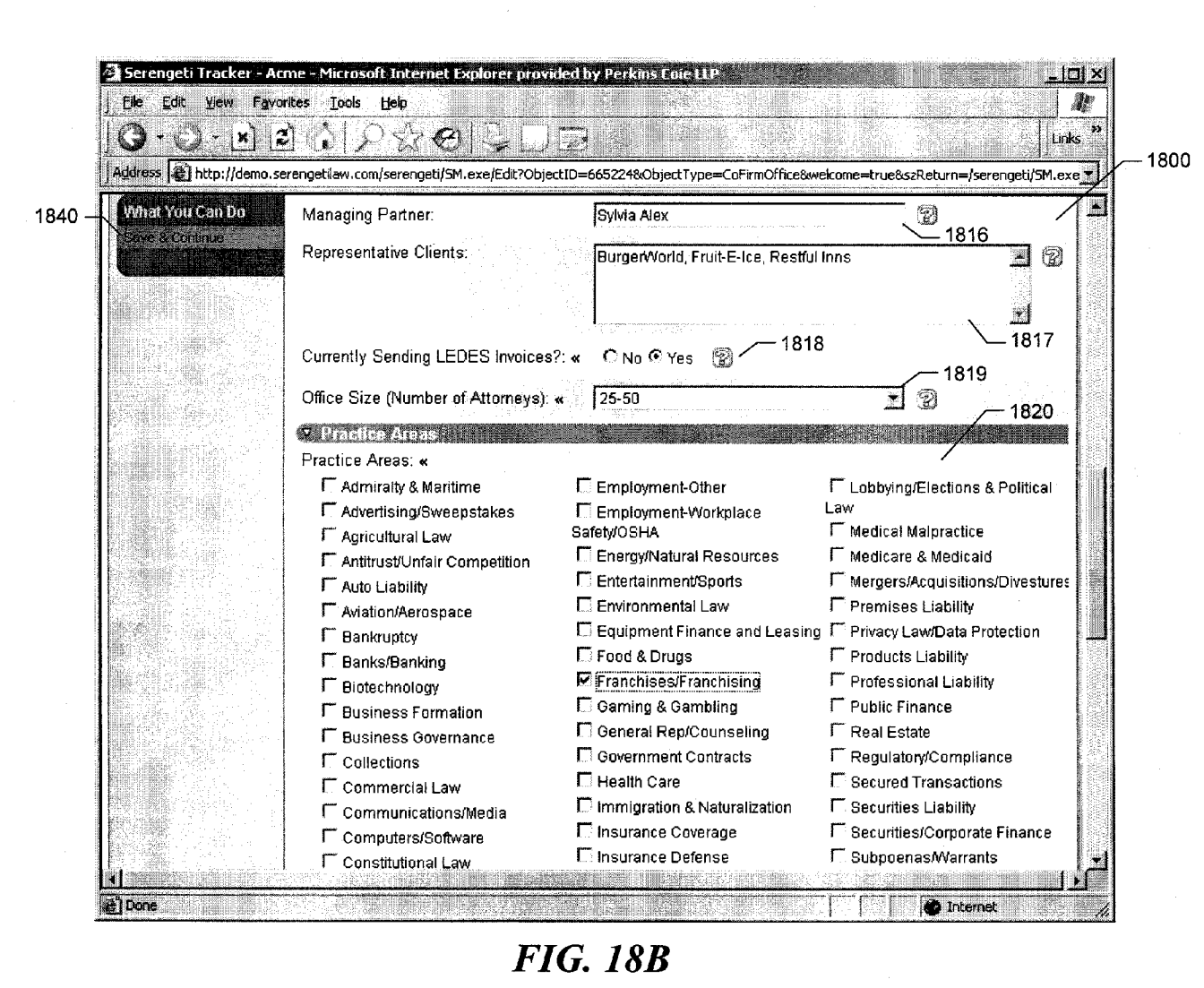
Figure 18C:
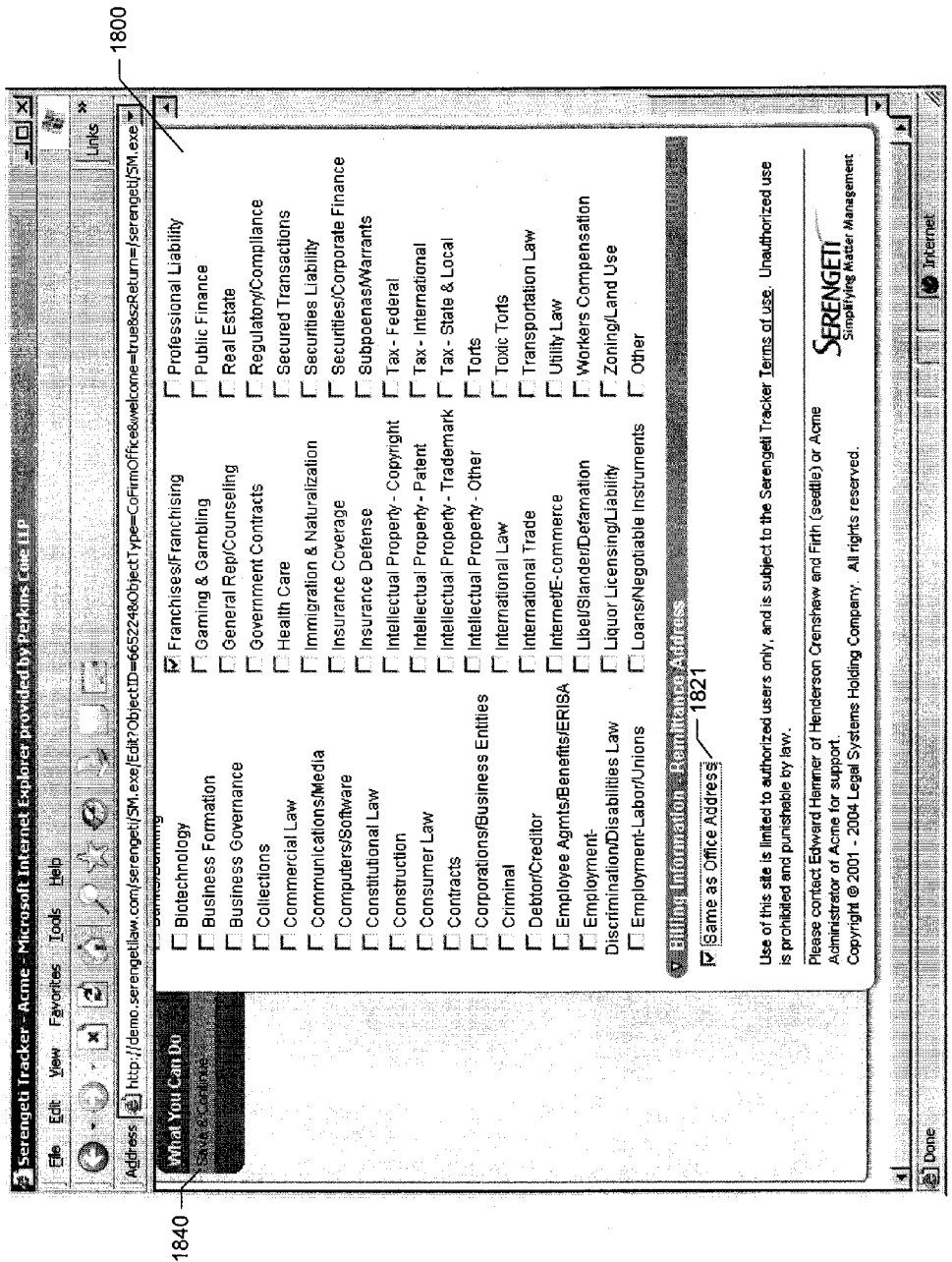

FIGS. 18A-18C together comprise a display diagram showing a sample display presented by the facility containing a form for entering firm office information. In some embodiments, the facility presents the display 1800 in response to the user clicking on control 1720 shown in FIG. 17. The display 1800 includes fields, such as: an active field 1801, a firm name field 1802, an office name field 1803, street fields 1804-1805, a city field 1806, a country field 1807, a state field 1808, a zip/postal code field 1809, a general phone number field 1810, a general fax number 1811, a tax ID field 1812, a VAT ID field 1813, an office base currency field 1814, and a tracker coordinator field 1815. The display 1800 further contains a managing partner field 1816, a representative clients field 1817, a currently sending LEDs invoices field 1818, an office size field 1819, and a practice areas field 1820. The display 1800 further includes a billing information/remittance address field 1821. After entering some or all of this information, the user may click on or otherwise select control 1840 to continue.

Figure 19:
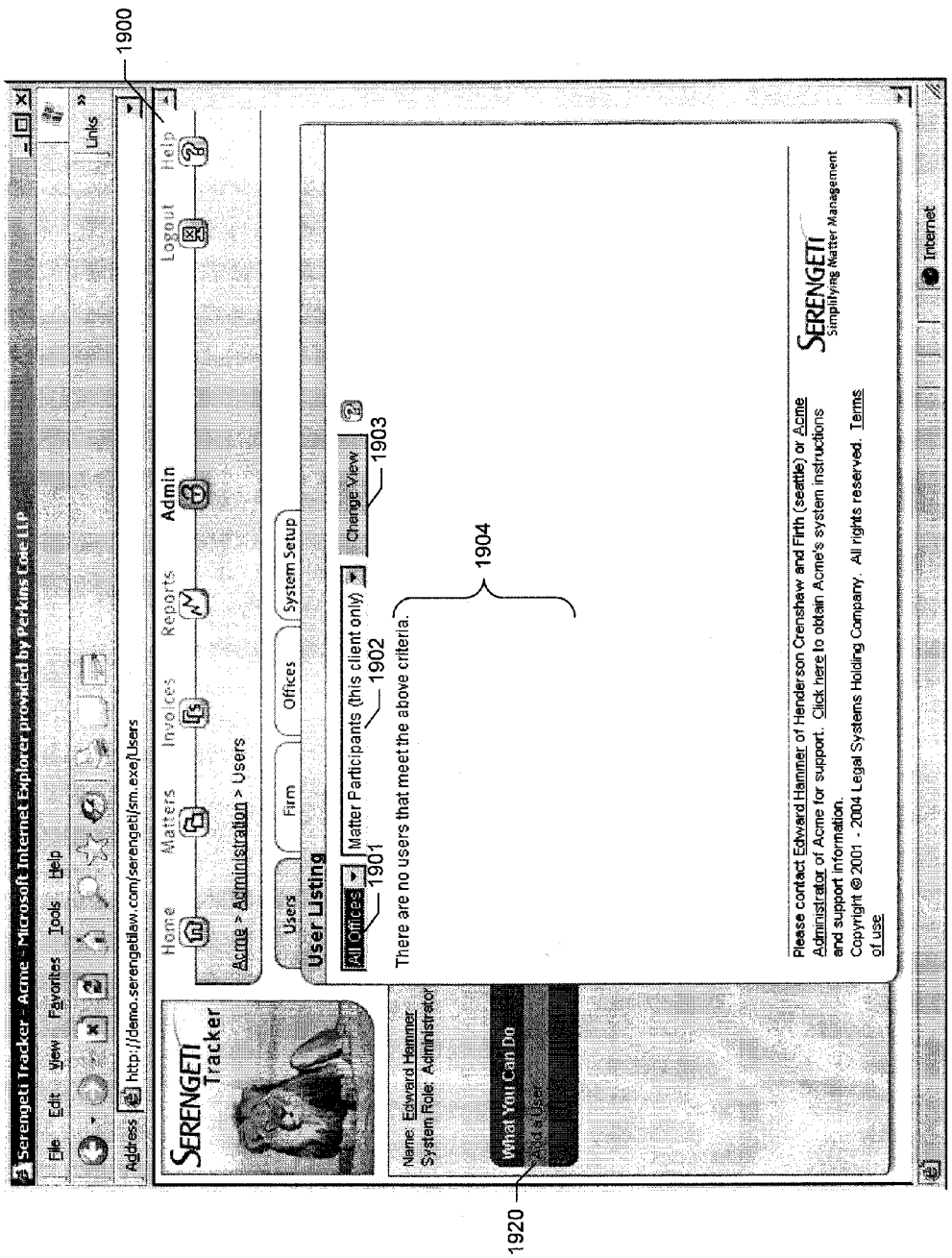
FIG. 19 is a display diagram showing a sample display presented by the facility containing a list of users created for the Henderson Crenshaw sample firm.

FIG. 19 is a display diagram showing a sample display presented by the facility containing a list of users created for the Henderson Crenshaw sample firm. In some embodiments, the facility presents the display 1900 in response to the user clicking on control 1840 shown in FIG. 18. The display 1900 includes controls 1901-1902 for specifying criteria for listing the Henderson Crenshaw users, and a control 1903 that the user may click on or otherwise select in order to display lists of Henderson Crenshaw users in accordance with the selected criteria. Indication 1904 indicates that the firm currently has no matter participant users. The user may click on or otherwise select control 1920 to add a new user for the Henderson Crenshaw firm.

Figure 20:
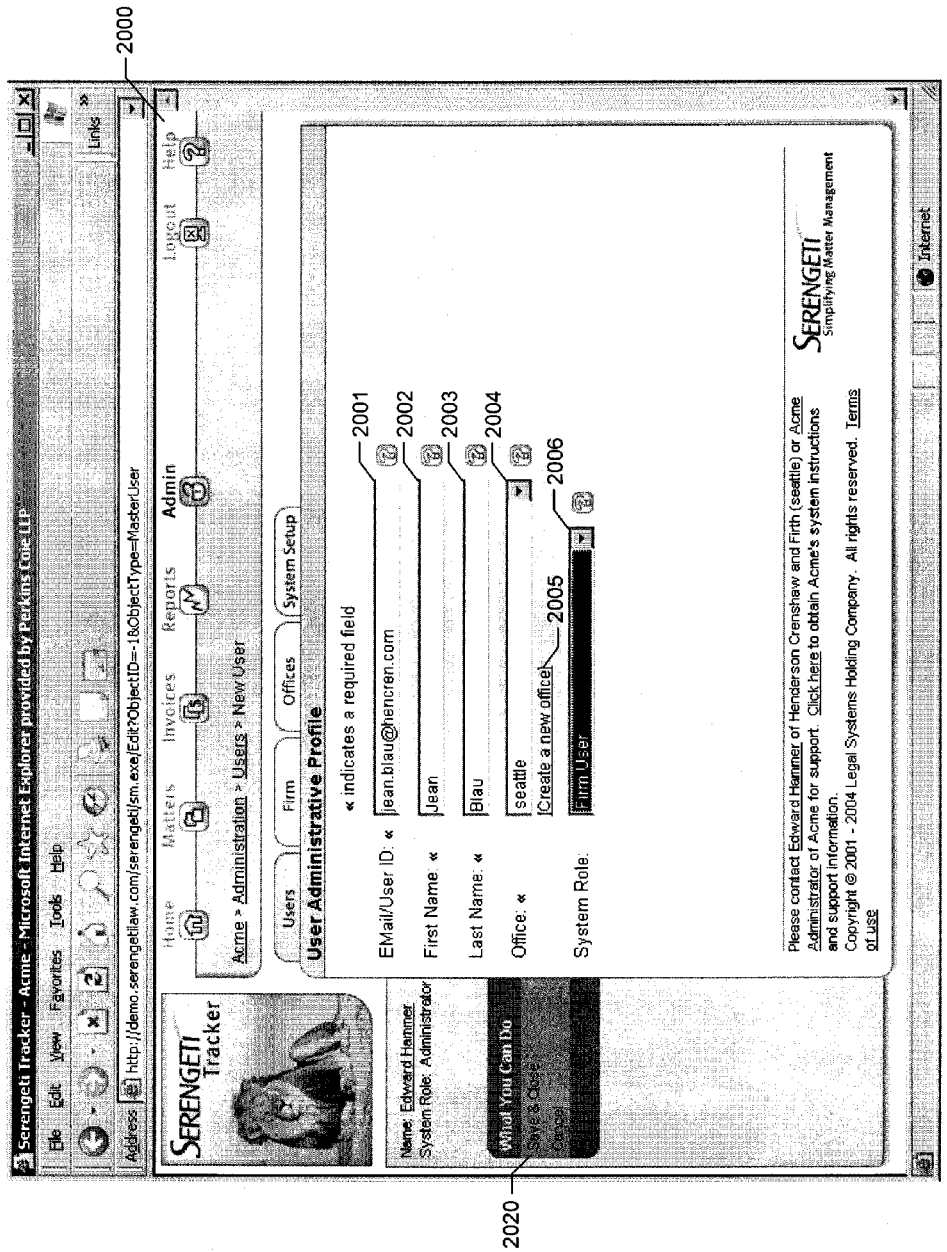
FIG. 20 is a display diagram showing a sample display presented by the facility containing a form for creating a new user.

FIG. 20 is a display diagram showing a sample display presented by the facility containing a form for creating a new user. In some embodiments, the facility presents the display 2000 in response to the user clicking on control 1920 shown in FIG. 19. The display 2000 includes fields, such as: an e-mail/user ID field 2001, a first name field 2002, a last name field 2003, an office field 2004 and a system role field 2006, as well as a link 2005 for creating a new office if the new user works in an office of the firm not yet created in the facility. After entering some or all of this information, the user can click on or otherwise select control 2020 to create the user.

Figure 21:
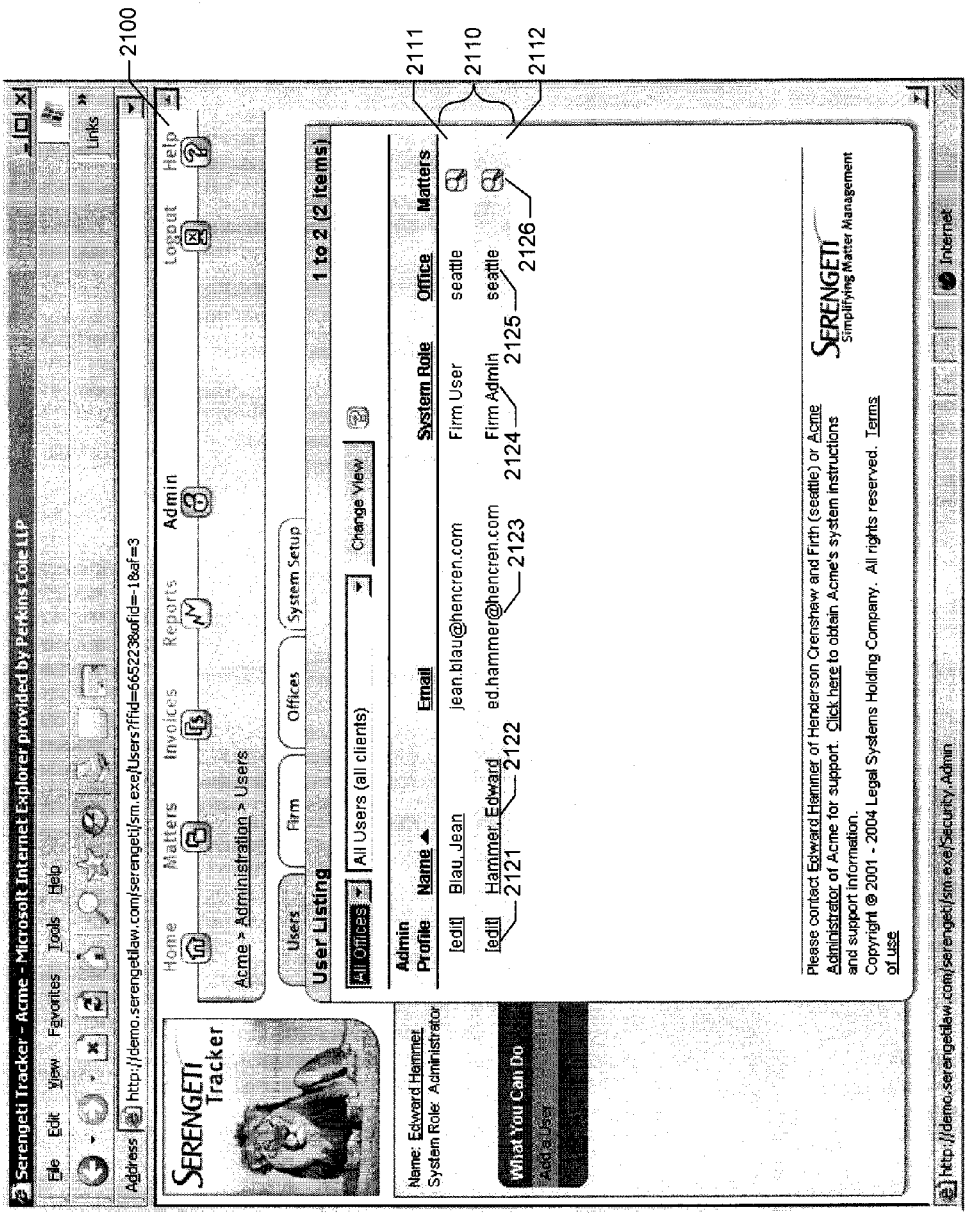
FIG. 21 is a display diagram showing a sample display presented by the facility containing a list of users for the Henderson Crenshaw firm after adding the new user as shown on FIG. 20.

FIG. 21 is a display diagram showing a sample display presented by the facility containing a list of users for the Henderson Crenshaw firm after adding the new user as shown on FIG. 20. In some embodiments, the facility presents the display 2100 in response to the user clicking on control 2020 shown in FIG. 20. The display 2100 includes a list of Henderson Crenshaw users 2110 made up of entries 2111 and 2112. Entry 2111 corresponds to the user added as shown in FIG. 20. Each entry contains the following columns: an administrative profile editing column 2121, a name column 2122, an e-mail column 2123, a system role column 2124, an office column 2125, and a view matters 2126.

FIGS. 22-24E show a company user identifying the added Henderson Crenshaw firm in assigning a new matter to it.

Figure 22:
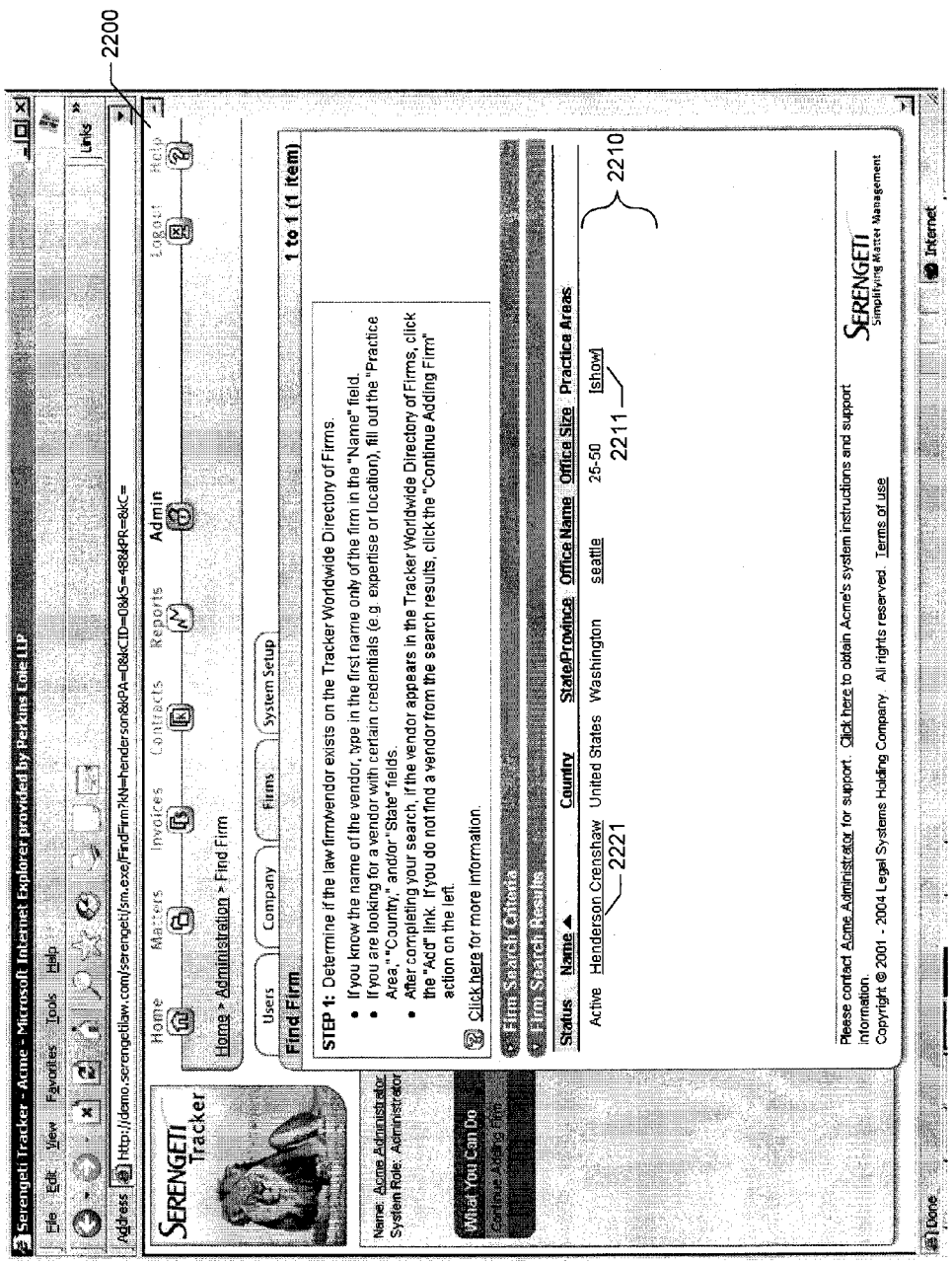
FIG. 22 is a display diagram showing a sample display presented by the facility containing an indication to the company user that the Henderson Crenshaw firm has been added.

FIG. 22 is a display diagram showing a sample display presented by the facility containing an indication to the company user that the Henderson Crenshaw firm has been added. The display 2200 includes a list 2210 of firms matching search criteria that specify the Henderson Crenshaw firm. The list includes entry 2211 for the Henderson Crenshaw firm. The user may click on link 2221 in this entry to display information about the Henderson Crenshaw firm.

Figure 23:
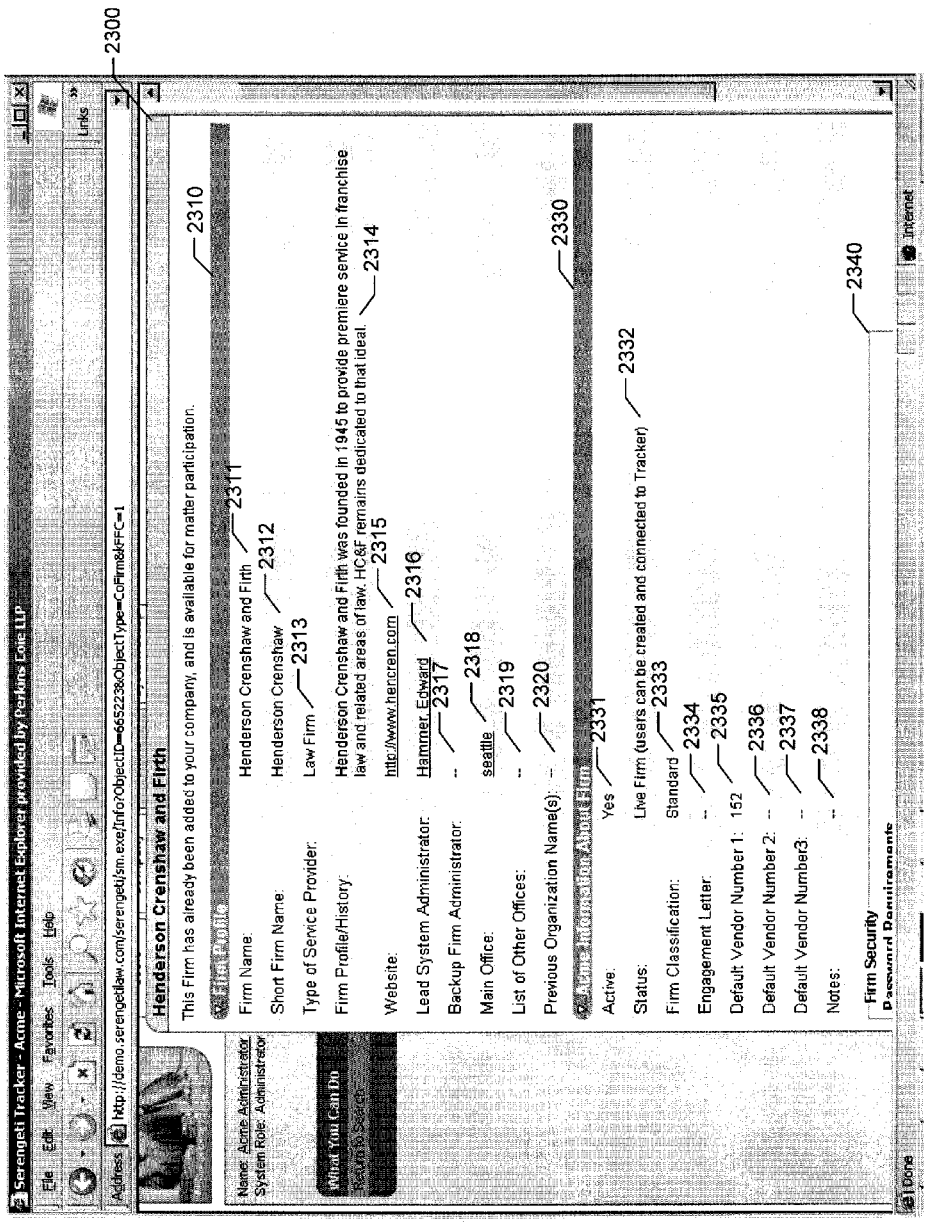
FIG. 23 is a display diagram showing a sample display presented by the facility containing information about the Henderson Crenshaw firm.

FIG. 23 is a display diagram showing a sample display presented by the facility containing information about the Henderson Crenshaw firm. In some embodiments, the facility presents the display 2300 in response to the user clicking on link 2221 shown in FIG. 22. The display 2300 includes a firm profile section 2310 including both information (1) initially input by the company user when adding the firm and/or (2) edited or added by the firm's lead system administrator, including the following information: an indication 2311 the firm name, an indication 2312 of short firm name, an indication 2313 of type of service provider, an indication 2314 of firm profile/history, an indication 2315 of firm web site, an indication 2316 of the lead system administrator, an indication 2317 of the backup firm administrator, an indication 2318 of the main office, an indication 2319 of other offices, and an indication 2320 of previous organization names. The display further includes a section 2330 containing information about the firm specific to the Acme company, including an indication 2331 of whether the firm is active, an indication 2332 of the firm's status for the company, an indication 2333 of the company's classification of the firm, an indication 2334 of an engagement letter executed by the firm and the company, indications 2335-2337 of default vendor numbers assigned to the firm by the company, and an indication 2338 of notes by the company about the firm. The display further includes firm security information 2340.

Figure 24A:
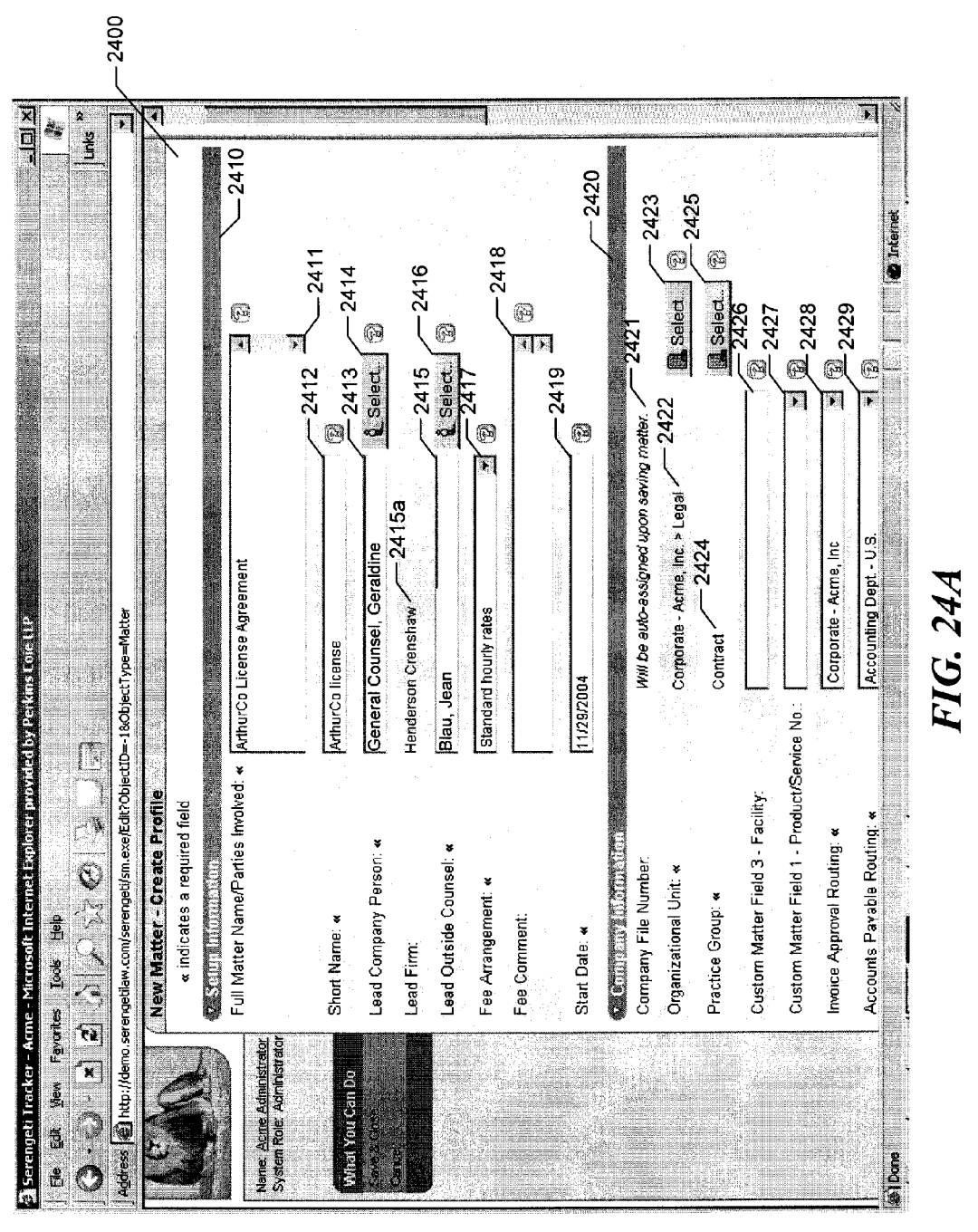
Figure 24B:
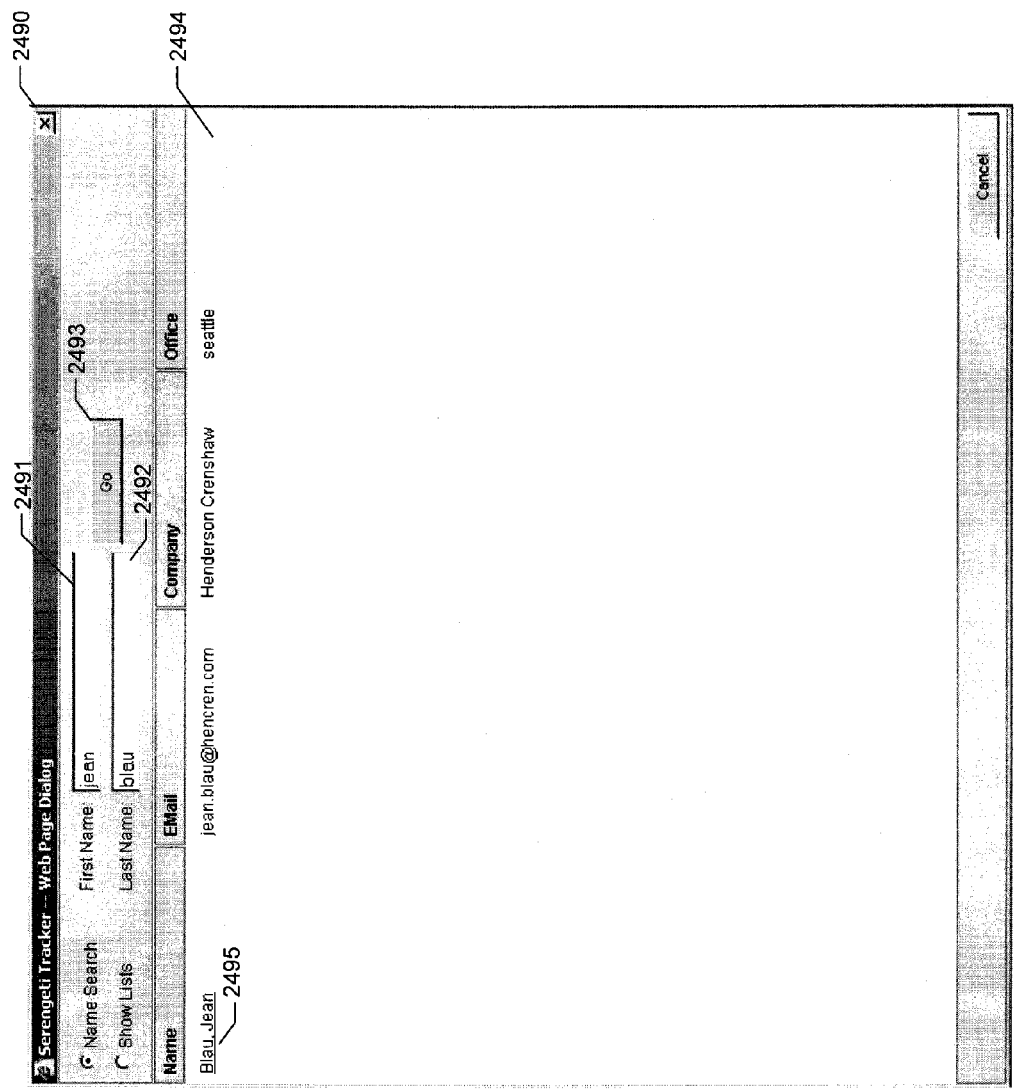
Figure 24C:
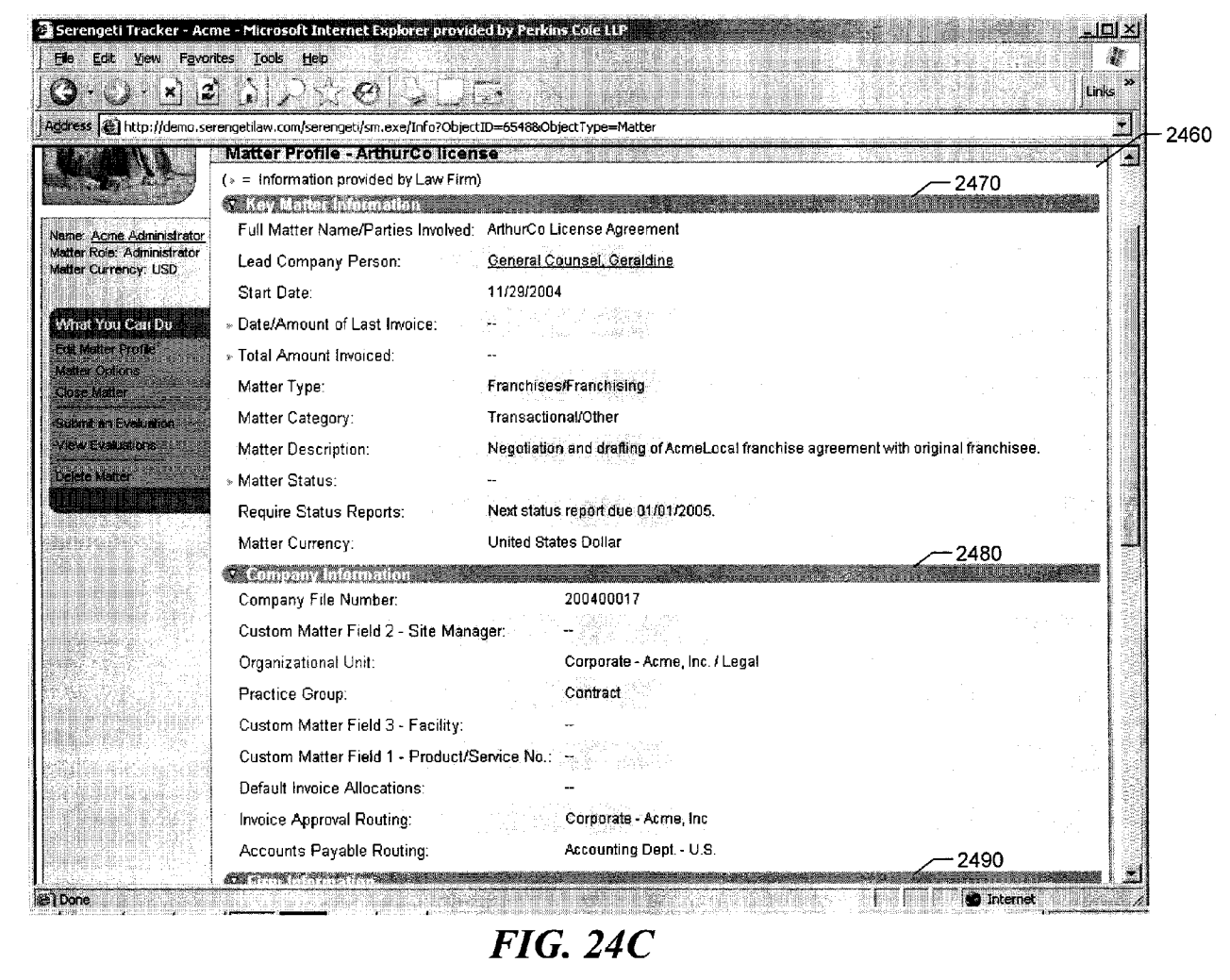
Figure 25:
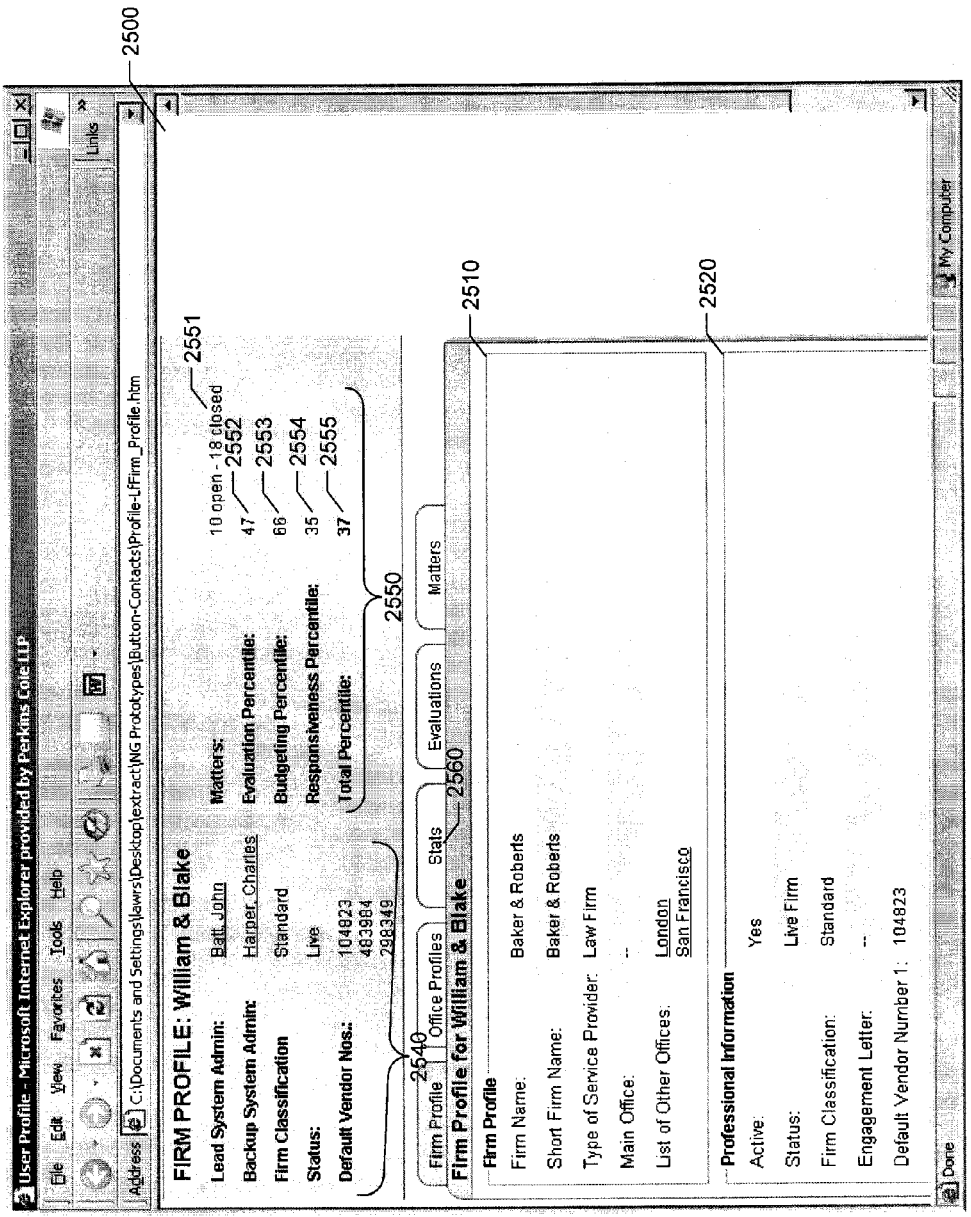
FIG. 25 is a display diagram showing a sample display presented by the facility containing a firm profile report.

FIGS. 24A-25 show a company user creating a matter that is assigned to the Henderson Crenshaw firm. FIGS. 24A-24B is a display diagram showing a sample display presented by the facility containing a form for creating a new matter. In some embodiments, the facility presents the form 2400 in response to the company user clicking on a "create new matter" link (not shown). The form includes the setup information section 2410 containing setup information fields such as the following: a full matter name field 2411; a short name field 2412; a lead company person field 2413, accompanied by a control 2414 for selecting the contents of field 2413; and a lead outside counsel field 2415, accompanied by a control 2416 for completing field 2415.

FIG. 24B is a display diagram showing a sample display presented by the facility containing a dialog box opened by the facility when the user clicks control 2416 in FIG. 24A to select contents for the lead outside counsel field 2415. The dialog box 2490 includes fields 2491 and 2492 in which the user may specify the lead outside counsel's first and/or last names, and a control 2493 that the user may click or otherwise select in order to display matching attorneys. As shown, the list contains only a single matching attorney, Jean Blau of Henderson Crenshaw. In order to select this attorney for field 2415 and this attorney's firm for field 2415a, the user clicks on link 2495 in entry 2494 for this attorney.

Returning to FIG. 24A, it can be seen that this attorney has been selected for field 2415, and this firm has been selected for field 2415a. The setup information section 2410 further includes a fee arrangement field 2417, a fee comment field 2418, and a start date field 2419. The display 2400 further includes a company information section 2420, containing company information fields such as the following: a company file number field 2421; an organizational unit field 2422, accompanied by a control 2423 for selecting the contents of field 2422; a practice group field 2424, accompanied by a control 2425 for selecting the contents of field 2424; custom matter fields 2426 and 2427 for facility and product/service number, respectively; and invoice approval routing field 2428; and an accounts payable routing field 2429. In some embodiments, the form 2400 contains additional sections and/or fields (not shown).

FIG. 24C is a display diagram showing a sample display presented by the facility containing an indication that the new matter has been created. The display 2460 includes the key matter information section 2470, a company information section 2480, and a firm information section 2490 each containing information collected as part of the matter creation process for this matter.

FIGS. 25-30 show firm and user profiles that reflect performance information for firms and users, some or all of which may be displayed in the vendor directory to company users to inform firm and attorney selection decisions. FIG. 25 is a display diagram showing a sample display presented by the facility containing a firm profile report. The display 2500 includes information such as firm profile information 2510 and 2540 and professional information 2520. In addition, the display includes performance overview information 2550, such as: an indication 2551 of the number of open and closed matters that the company has assigned to the firm; an indication 2552 of the percentile rank of evaluations that the firm has received from companies that have engaged it; an indication 2553 of the percentile rank of the firm's success at budgeting; an indication 2554 of percentile rank of the firm's level of responsiveness; and an indication 2555 of percentile rank of a score for the firm aggregated from individual performance statistics such as the foregoing. The display 2560 further includes a statistics tab 2560 that the user may click in order to display more detailed statistics about this firm.

FIGS. 26A-26B are display diagrams together showing a sample display presented by the facility containing a detailed firm performance statistics report. In some embodiments, the facility presents the display 2600 in response to the user clicking on statistics tab 2560 shown in FIG. 25. The display 2600 includes a matters and spending section 2610 containing matters and spending information, such as: an indication 2611 of the total number of unique open matters in the client's current fiscal year through the end of the most recently-completed month; an indication 2612 of the total number of unique open matters in the client's immediately-previous fiscal year; an indication 2613 of the total number of unique open matters in the client's second-previous fiscal year; an indication 2614 of the total fees and expenses in the client's current fiscal year through the end of the most recently-completed month; an indication 2615 of the total fees and expenses in the client's immediately-previous fiscal year; and an indication 2616 of total fees and expenses in the client's second-previous fiscal year. The display further includes a budget to actual spending section 2620 including budget to actual spending information in categories such as the following: a percentage of budget category 2621, a cumulative spending to budget percentage category 2622, and an average percentage deviation from budget category 2623. The display 2600 further includes a responsiveness section 2630, including responsiveness information for a number of categories including: a percentage of matter profiles that the firm's responsible lawyer did not complete within 20 days category 2631, an average number of days to complete matter profile category 2632, a percentage of status reports more than 20 days late category 2633, an average number of days to complete status report category 2634, a percentage of budgets filed more than 20 days after required category 2635, an average number of days to complete budget category 2636, a percentage of bills submitted more than 20 days after billing period category 2637, and an average number of days to submit invoice after billing period category 2638. The display further includes an evaluations tab 2640 that the user may click in order to display a report of evaluations received by the firm.

FIG. 27 is a display diagram showing a sample display presented by the facility containing a report of evaluations received by the same firm. In various embodiments, various shown information elements may be limited to evaluations submitted by users of only the company that the user viewing the report works for, while others may be expanded to cover evaluations received for the firm by any company that has engaged the firm. In some embodiments, the facility presents the display 2700 in response to the user clicking on evaluations tab 2640 shown in FIGS. 26A-26B. The display 2700 includes a matter evaluation summary section 2710 including information relating to evaluation categories such as: an understood goals category 2711, an expertise category 2712, an efficiency category 2713, a responsiveness category 2714, a predictive accuracy category 2715, an effectiveness category 2716, and an overall evaluation 2717. The display further includes a matter evaluation section 2720, including selective information from individual evaluations received from company users for particular matters assigned to the firm by the company, including matter evaluation entries 2721-2723.

Figure 28A:
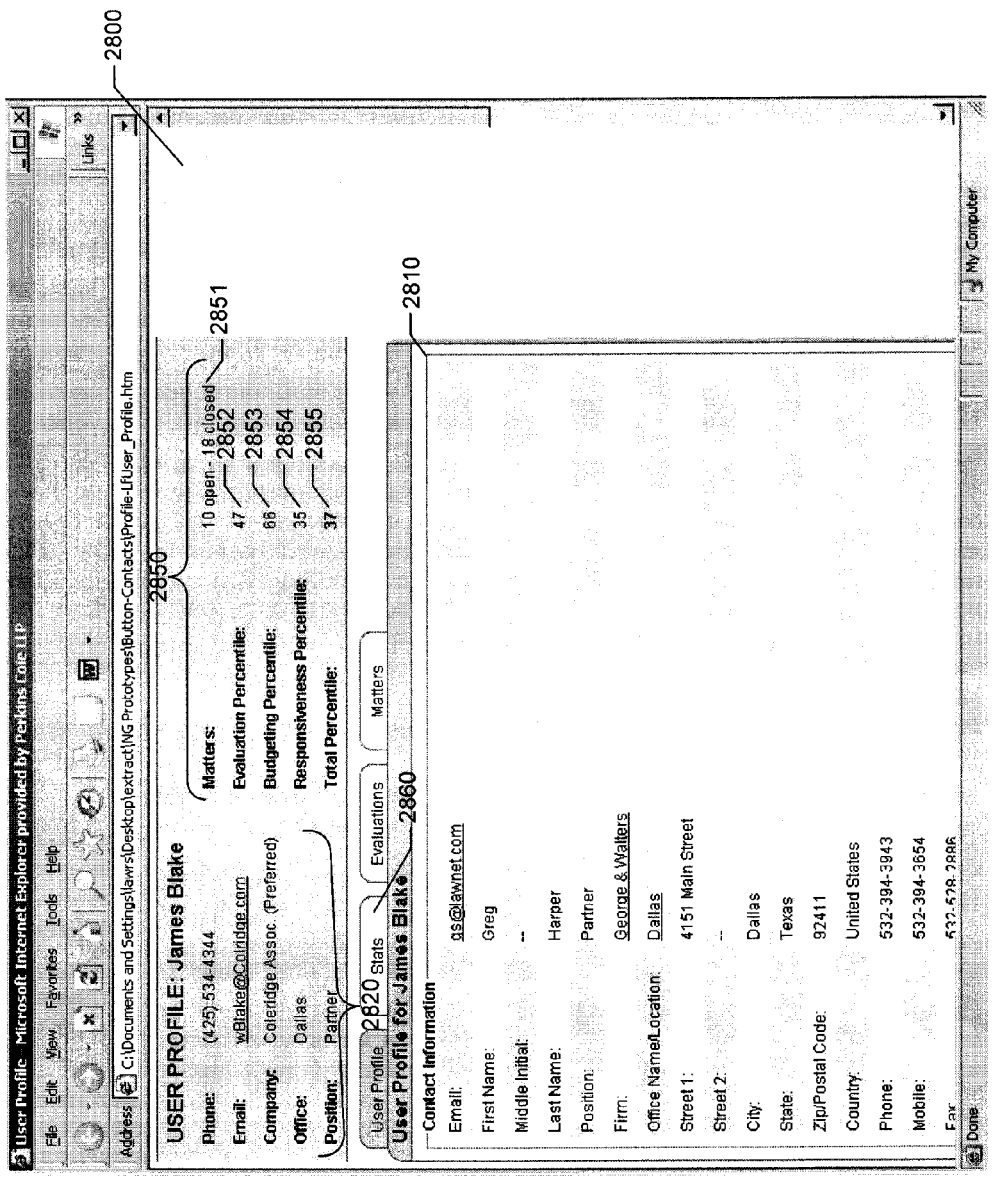
FIGS. 28A-28B are display diagrams together showing a sample display presented by the facility containing a user profile report.
Figure 28B:
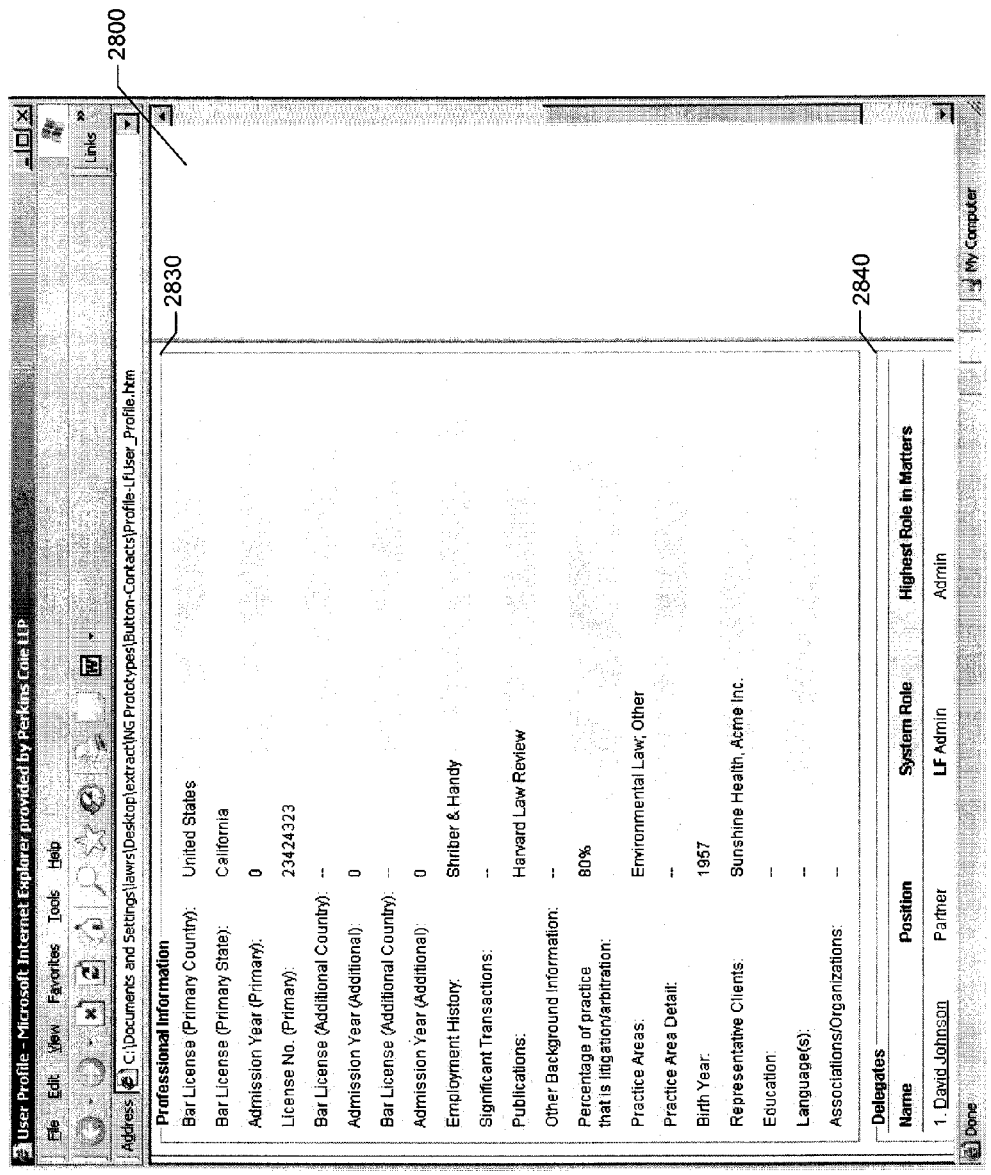

FIGS. 28A-28B are display diagrams together showing a sample display presented by the facility containing a user profile report. The display 2800 includes for this user contact information 2810 and 2820, professional information 2830, and a list of delegates 2840. In addition, the display includes overview performance information 2850, such as: an indication 2851 of the number of open and closed matters that the company has assigned to the attorney; an indication 2852 of the percentile rank of evaluations that the attorney has received from companies that have engaged the attorney; an indication 2853 of a percentile rank of the attorney's success at budgeting; a indication 2854 of percentile rank of the attorney's level of responsiveness; and an indication 2855 of the percentile rank of a score for the attorney aggregated from individual performance statistics such as the foregoing. The display further includes a statistics tab 2860 that the user may click in order to display more detailed statistics about the attorney.

FIGS. 29A-29B are display diagrams together showing a sample display presented by the facility containing a detailed attorney performance statistics report. In some embodiments, the facility presents the display 2900 in response to the user clicking on statistics tab 2860 shown in FIGS. 28A-28B. The display 2900 includes a matters and spending section 2910 containing matters and spending information, such as: an indication 2911 of the total number of the attorney's unique open matters in the client's current fiscal year through the end of the most recently-completed month, an indication 2912 of the total number of the attorney's unique open matters in the client's immediately-previous fiscal year, an indication 2913 of the total number of attorney's unique open matters in the client's second-previous fiscal year, an indication 2914 of the total fees and expenses for the attorney in the client's current fiscal year through the end of the most recently-completed month; an indication 2915 of the attorney's total fees and expenses in the client's immediately-previous fiscal year; and an indication 2916 of the attorney's total fees and expenses in the client's second-previous fiscal year. The display further includes a budget to actual spending section 2920 including budget to actual spending information in categories such as the following: a percentage of budget category 2921, a cumulative spending to budget percentage category 2922, and an average percentage deviation from budget category 2923. The display 2900 further includes a responsiveness section 2930, including responsiveness information for a number of categories including: a percentage of matter profiles that the attorney did not complete within 20 days category 2931, and average number of days to complete matter profile category 2932, a percentage of status reports more than 20 days late category 2933, an average number of days to complete status report category 2934, a percentage of budgets filed more than 20 days after a required category 2935, an average number of days to complete budget category 2936, a percentage of bills submitted more than 20 days after billing period category 2937, and an average number of days to submit invoice after billing period category 2938. The display further includes an evaluations tab 2940 that the user may click in order to display a report of evaluations received by the attorney.

Figure 30:
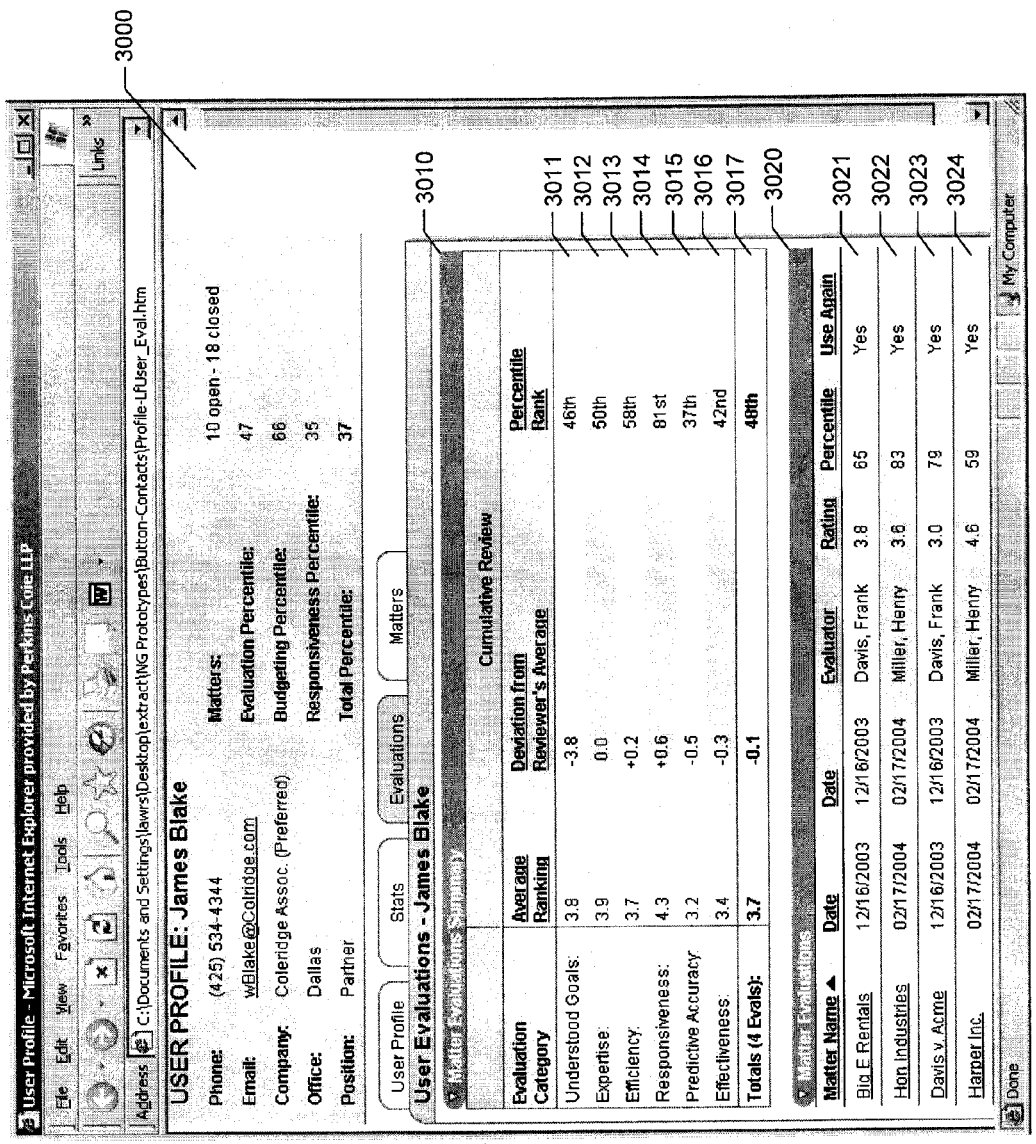
FIG. 30 is a display diagram showing a sample display presented by the facility containing a report of evaluations received by the same attorney.

FIG. 30 is a display diagram showing a sample display presented by the facility containing a report of evaluations received by the same attorney. In various embodiments, various shown information elements may be limited to evaluations submitted by users of only the company that the user viewing the report works for, while others may be expanded to cover evaluations received for the attorney by any company that has engaged the attorney. In some embodiments, the facility presents the display 3000 in response to the user clicking on evaluations tab 2940 shown in FIGS. 29A-29B. The display 3000 includes a matter evaluation summary section 3010 including information relating to evaluation categories such as: an understood goals category 3011, an expertise category 3012, and efficiency category 3013, a responsiveness category 3014, a predictive accuracy category 3015, an effectiveness category 3016, and an overall evaluation 3017. The display further includes a matter evaluation section 3020, including selective information from individual evaluations received from company users for particular matters assigned to the attorney by the company, including matter evaluation entries 3021-3024.

While various exemplary sets of data fields are discussed above, such as in connection with the Tables and Figures, those skilled in the art will appreciate that the facility may be used in conjunction with sets of fields that differ from those discussed. Similarly, while various forms of vendor and vendor user performance and evaluation data are discussed above, those skilled in the art will appreciate that the facility may be used in conjunction with a variety of different forms of vendor and vendor user performance and evaluation data.

It will be appreciated by those skilled in the art that the above-described facility may be straightforwardly adapted or extended in various ways. For example, the facility may be used to store and retrieve various kinds of information about matters or other projects performed by vendors of a wide variety of types for clients of a wide variety of types. Various supporting technologies—such as networking, load balancing and connection redirection, database and database replication, etc.—both presently in use and later-developed, may be used in connection with the facility. While the foregoing description makes reference to particular embodiments, the scope of the invention is defined solely by the claims that follow and the elements recited therein.

We claim:

1. A method, in a computing system including a processor and memory, for creating a relationship between a client and a vendor within a client/vendor data store, the client/vendor data store being stored in the memory and containing vendor records for a plurality of vendors, the method comprising:

retrieving a list of vendors for which the client/vendor data store contains vendor records wherein each vendor provides professional services to clients of the vendor;

in order to create a relationship between a distinguished client and a first vendor for which the client/vendor data store contains a vendor record, wherein the relationship between the distinguished client and the first vendor in the client/vendor data store has not previously been created:

receiving a selection, by a client user of the distinguished client, of the first vendor in the retrieved list, and adding to a client record for the distinguished client a reference to the vendor record for the first vendor, wherein the vendor record for the first vendor includes vendor information already present in the computing system, and wherein the adding of the reference to the vendor record for the first vendor is performed by the processor;

in order to create a relationship between the distinguished client and a second vendor for which the client/vendor data store does not contain a vendor record, wherein the relationship between the distinguished client and the second vendor has not previously been created:

receiving information from the client user of the distinguished client identifying the second vendor, creating in the client/vendor data store a vendor record for the second vendor that contains the received information, wherein the creating of the vendor record for the second vendor is performed by the processor, and adding to the client record for the distinguished client a reference to the created vendor record for the second vendor, wherein the adding of the reference to the created vendor record for the second vendor is performed by the processor; and in response to creating a relationship between the distinguished client and any vendor, providing to one or more users of the vendor with which the relationship was created the ability to submit invoices to the distinguished client in connection with the vendor's ongoing provision of professional services to the distinguished client by the vendor for a project.

2. The method of claim 1 wherein the retrieved list of vendors includes performance statistics for the vendors.

3. The method of claim 2 wherein the performance statistics for the vendors include an indication of the extent to which each vendor has achieved predicted outcomes.

4. The method of claim 2 wherein the performance statistics for the vendors include an indication of the extent to which each vendor has satisfied project budgets.

5. The method of claim 2 wherein the performance statistics for the vendors include an indication of the extent to which each vendor has satisfied project schedules.

6. The method of claim 2 wherein the performance statistics for the vendors include an indication of the extent to which each vendor has maintained the currency of project information.

7. The method of claim 2 wherein the performance statistics for the vendors include an indication of the extent to which each vendor has achieved positive substantive results.

8. The method of claim 2 wherein the performance statistics for the vendors include an indication of each vendor's specialty areas.

9. The method of claim 1 wherein the method is performed in connection with an application service provider used by both clients and vendors, and the retrieved list of vendors includes only vendors already using the application service provider.

10. The method of claim 1 wherein the relationship is created between the distinguished client and the first vendor without receiving vendor information for the first vendor from a vendor user of the first vendor, and without creating in the client/vendor data store a vendor record for the first vendor that contains received vendor information for the first vendor.

11. A computer-readable medium whose contents cause a computing system to perform operations for creating a relationship between a client and a vendor within a client/vendor data store, the client/vendor data store containing vendor records for a plurality of vendors, the operations comprising:

retrieving list of vendors for which the client/vendor data store contains vendor records;

in order to create a relationship between a distinguished client and a first vendor for which the client/vendor data store contains a vendor record, wherein the relationship between the distinguished client and the first vendor in the client/vendor data store has not previously been created:

receiving a selection, by a client user of the distinguished client, of the first vendor in the retrieved list, and adding to a client record for the distinguished client a reference to the vendor record for the first vendor, wherein the vendor record for the first vendor includes vendor information already present in the computing system;

in order to create a relationship between the distinguished client and a second vendor for which the client/vendor data store does not contain a vendor record, wherein the relationship between the distinguished client and the second vendor has not previously been created:

receiving information from the client user of the distinguished client identifying the second vendor, creating in the client/vendor data store a vendor record for the second vendor that contains the received information, and adding to the client record for the distinguished client a reference to the created vendor record for the second vendor; and in response to creating a relationship between the distinguished client and any vendor, providing to one or more users of the vendor with which the relationship was created the ability to submit invoices to the distinguished client in connection with the vendor's provision of services to the distinguished client for a project.

12. The method of claim 1 wherein receiving information from the client user identifying the second vendor includes receiving a designation of a vendor administrator, wherein the designated vendor administrator cannot later be modified by the client user.

13. The computer-readable medium of claim 11 wherein receiving information from the client user identifying the second vendor includes receiving a designation of a vendor administrator, wherein the designated vendor administrator cannot later be modified by the client user.

14. A computer-readable medium whose contents cause a computing system to perform operations for creating relationships clients and vendors within a client/vendor data store, the operations comprising:

creating a first relationship between a first client and a first vendor for which the client/vendor data store does not contain a vendor record at least in part by:

receiving, from a first client user of the first client, information identifying the first vendor, creating in the client/vendor data store a vendor record for the first vendor, the created vendor record including the received information, and adding to a first client record for the first client a reference to the created vendor record;

creating a second relationship between a second client and the first vendor, wherein the second relationship between the second client and the first vendor has not previously been created in the client/vendor data store, at least in part by:

generating a list of vendors for which the client/vendor data store includes vendor records, the list including at least a portion of the received information identifying the first vendor, receiving, from a second client user of the second client, a selection of the of the first vendor in the generated list, and adding to a second client record for the second client a reference to the vendor record for the first vendor, wherein the vendor record for the first vendor includes the information received from the first client user of the first client;

in response to creating the first relationship between the first client and the first vendor, providing, to one or more users of the first vendor, the ability to submit invoices to the first client in connection with the vendor's provision of services to the first client for a first project; and in response to creating the second relationship between the second client and the first vendor, providing, to one or more users of the first vendor, the ability to submit invoices to the second client in connection with the vendor's provision of services to the second client for a second project.

15. A system comprising:

a component configured to create, in a client/vendor data store, a vendor record for a first vendor for which the client/vendor data store does not contain a vendor record, the created vendor record including information, received from a first client user of a first client, identifying the first vendor;

a component configured to add to a first client record for the first client a reference to the created vendor record to create a first relationship between the first client and the first vendor;

a component configured to generate a list of vendors for which the client/vendor data store includes vendor records, the generated list including at least a portion of the received information identifying the first vendor;

a component configured to receive, from a second client user of a second client, a selection of the of the first vendor in the generated list;

a component configured to add to a second client record for the second client a reference to the vendor record for the first vendor to create a second relationship between the second client and the first vendor, wherein the second relationship between the second client and the first vendor has not previously been created in the client/vendor data store and wherein the vendor record for the first vendor includes the information received from the first client user of the first client;

a component configured to, in response to the creation of the first relationship between the first client and the first vendor, provide, to one or more vendor users of the first vendor, the ability to submit invoices to the first client in connection with the vendor's provision of services to the first client for a first project; and a component configured to, in response to the creation of the second relationship between the second client and the first vendor, provide, to one or more vendor users of the first vendor, the ability to submit invoices to the second client in connection with the vendor's provision of services to the second client for a second project.

* * * * *

UNITED STATES PATENT AND TRADEMARK OFFICE
CERTIFICATE OF CORRECTION

| | |
|---|---|
| PATENT NO. | : 8,108,428 B1 |
| APPLICATION NO. | : 11/001630 |
| DATED | : January 31, 2012 |
| INVENTOR(S) | : Wencel et al. |

It is certified that error appears in the above-identified patent and that said Letters Patent is hereby corrected as shown below:

Column 8, line 67, delete "Table 2)" and insert -- Table 2). --, therefor.

Column 23, line 2, in claim 14, before "first" delete "of the".

Column 24, line 6, in Claim 15, before "first" delete "of the".

Signed and Sealed this
Twenty-ninth Day of May, 2012

David J. Kappos
*Director of the United States Patent and Trademark Office*